US012807752B2

(12) United States Patent
Miyafuji

(10) Patent No.: US 12,807,752 B2
(45) Date of Patent: Nov. 24, 2026

(54) (METH)ACRYLIC ESTER COPOLYMER AND CURABLE COMPOSITION CONTAINING THE SAME

(71) Applicant: KANEKA CORPORATION, Osaka (JP)

(72) Inventor: Kiyoshi Miyafuji, Hyogo (JP)

(73) Assignee: KANEKA CORPORATION, Osaka (JP)

( * ) Notice: Subject to any disclaimer, the term of this patent is extended or adjusted under 35 U.S.C. 154(b) by 997 days.

(21) Appl. No.: 18/149,299

(22) Filed: Jan. 3, 2023

(65) Prior Publication Data

US 2023/0144994 A1 May 11, 2023

Related U.S. Application Data

(63) Continuation of application No. PCT/JP2021/025670, filed on Jul. 7, 2021.

(30) Foreign Application Priority Data

Jul. 10, 2020 (JP) ................................. 2020-119409
Dec. 11, 2020 (JP) ................................. 2020-205540

(51) Int. Cl.
*C08F 290/04* (2006.01)
*C08L 71/02* (2006.01)

(52) U.S. Cl.
CPC ............ *C08F 290/04* (2013.01); *C08L 71/02* (2013.01)

(58) Field of Classification Search
None
See application file for complete search history.

(56) References Cited

U.S. PATENT DOCUMENTS

| | | | | |
|---|---|---|---|---|
| 9,969,843 | B2 * | 5/2018 | Harumashi | ............. C08L 71/02 |
| 2018/0223139 | A1 | 8/2018 | Miyafuji | |

FOREIGN PATENT DOCUMENTS

| | | | |
|---|---|---|---|
| EP | 2495286 | A1 | 9/2012 |
| JP | S52-73998 | A | 6/1977 |
| JP | S59-122541 | A | 7/1984 |
| JP | 2011-231149 | A | 11/2011 |
| WO | WO 2007023669 | A1 * | 3/2007 |
| WO | 2017/057719 | A1 | 4/2017 |

* cited by examiner

*Primary Examiner* — Tae H Yoon
(74) *Attorney, Agent, or Firm* — Osha Bergman Watanabe & Burton LLP

(57) ABSTRACT

Provided is a (meth)acrylic ester copolymer (B) having a reactive silicon group represented by the following formula (1): $—SiR^5_cX_{3-c}$ (1). $R^5$ is a substituted or unsubstituted hydrocarbon group having 1 to 20 carbon atoms, X is a hydroxy group or a hydrolyzable group, and c is 0 or 1. A monomer component of the copolymer includes a (meth) acrylic ester (b1), a (meth)acrylic ester polymer (b2) having more than one (meth)acryloyl groups per molecule, and a chain transfer agent (b3) having a mercapto group. The monomer component further includes a monomer (b4) having a reactive silicon group and a polymerizable unsaturated group, and/or the chain transfer agent (b3) having a mercapto group further has a reactive silicon group.

20 Claims, No Drawings

(METH)ACRYLIC ESTER COPOLYMER AND CURABLE COMPOSITION CONTAINING THE SAME

TECHNICAL FIELD

One or more embodiments of the present invention relate to a (meth)acrylic ester copolymer having a reactive silicon group, a method of producing the copolymer, and a curable composition containing the copolymer.

BACKGROUND

An organic polymer that has a silicon group having a hydroxy or hydrolyzable group on a silicon atom and capable of forming a siloxane bond through a hydrolysis-condensation reaction (this silicon group may be referred to as a "reactive silicon group" hereinafter) undergoes a reaction under the effect of moisture or the like even at room temperature. Crosslinking of such an organic polymer through a siloxane condensation reaction of the reactive silicon group is known to give a rubbery cured product.

Among this kind of organic polymers, a polyoxyalkylene polymer having a reactive silicon group has a relatively low viscosity and thus exhibits high workability when a composition containing the polyoxyalkylene polymer is prepared or used. Such a polyoxyalkylene polymer is widely used in various products such as a sealing material, an adhesive, and a paint because the resulting cured product has a good balance among performance characteristics such as mechanical properties, weathering resistance, and dynamic durability (see Patent Literature 1).

A curable composition is known in which a reactive silicon group-containing polyoxyalkylene polymer and a reactive silicon group-containing (meth)acrylic ester polymer are used in combination to improve the weathering resistance and adhesion of the reactive silicon group-containing polyoxyalkylene polymer (see Patent Literature 2). The curable composition is used as a weather-resistant sealant or an industrial adhesive.

A reported example of reactive silicon group-containing (meth)acrylic ester polymers is one whose constituent monomers are a monomer having a reactive silicon group and a polymerizable unsaturated group and a macromonomer having a polymerizable unsaturated group (see Patent Literature 3).

PATENT LITERATURE

PTL 1: Japanese Laid-Open Patent Application Publication No. S52-73998

PTL 2: Japanese Laid-Open Patent Application Publication No. S59-122541

PTL 3: WO 2017/057719

It is desirable that a polymer having a reactive silicon group should have a narrow molecular weight distribution and a low viscosity so as to be easy to handle before curing and should exhibit good physical properties after curing.

In view of the above circumstances, one or more embodiments of the present invention aim to provide: a reactive silicon group-containing (meth)acrylic ester copolymer that has a narrow molecular weight distribution and a low viscosity and that exhibits good physical properties after curing; and a curable composition containing the copolymer.

SUMMARY

As a result of intensive studies with the goal of solving the above, the present inventors have found that the inclusion of particular monomers and a particular chain transfer agent in a monomer component of a reactive silicon group-containing (meth)acrylic ester polymer can be a solution, and have completed one or more embodiments of the present invention based on this finding.

Specifically, a first aspect of one or more embodiments of the present invention relates to a (meth)acrylic ester copolymer (B) having a reactive silicon group represented by the following formula (1): $—SiR^5_cX_{3-c}$ (1), wherein $R^5$ is a substituted or unsubstituted hydrocarbon group having 1 to 20 carbon atoms, X is a hydroxy group or a hydrolyzable group, and c is 0 or 1, wherein a monomer component of the copolymer (B) includes: a (meth)acrylic ester (b1); a (meth) acrylic ester polymer (b2) having more than one (meth) acryloyl groups per molecule; and a chain transfer agent (b3) having a mercapto group, and the monomer component further includes a monomer (b4) having a reactive silicon group and a polymerizable unsaturated group, and/or the chain transfer agent (b3) having a mercapto group further has a reactive silicon group.

The (meth)acrylic ester polymer (b2) may constitute 0.2 to 5.0 mol % of the monomer component.

The chain transfer agent (b3) having a mercapto group may constitute 0.4 to 15 mol % of the monomer component.

The (meth)acrylic ester polymer (b2) may have a number-average molecular weight of 500 to 50,000.

The (meth)acrylic ester copolymer (B) may have a weight-average molecular weight of 80,000 or less.

The (meth)acrylic ester copolymer (B) may have a dispersity of 3.0 to 11.0. A molar ratio of the (meth)acrylic ester polymer (b2) to the chain transfer agent (b3) having a mercapto group may be 0.12 or more.

A second aspect of one or more embodiments of the present invention relates to a (meth)acrylic ester copolymer (B) having a reactive silicon group represented by the formula (1), wherein the copolymer (B) includes a structure in which two first molecular chains are bonded to each other via one second molecular chain, both ends of the second molecular chain are bonded to a non-terminal moiety of one of the first molecular chains and a non-terminal moiety of the other first molecular chain, respectively, each of the first and second molecular chains includes a molecular chain of a (meth)acrylic ester copolymer, the reactive silicon group is bonded to each of the first molecular chains, and each of the first molecular chains has, at either end thereof, a structure represented by —S—R, wherein S is a sulfur atom and R is a hydrocarbon group optionally having the reactive silicon group.

A monomer component of the first molecular chain may include at least one monomer selected from the group consisting of a methacrylic ester, isobornyl acrylate, dicyclopentenyl acrylate, and dicyclopentanyl acrylate, and a monomer component of the second molecular chain includes an acrylic ester.

The at least one monomer selected from the group consisting of a methacrylic ester, isobornyl acrylate, dicyclopentenyl acrylate, and dicyclopentanyl acrylate constitutes 60 wt % or more of the monomer component of the first molecular chain, and the acrylic ester may constitute 60 wt % or more of the monomer component of the second molecular chain.

A sulfur atom concentration in the (meth)acrylic ester copolymer (B) may be from 700 to 20,000 ppm.

A third aspect of one or more embodiments of the present invention relates to a curable composition containing the (meth)acrylic ester copolymer (B).

The curable composition may further contain a polyoxyalkylene polymer (A) having a reactive silicon group represented by the formula (1).

The polyoxyalkylene polymer (A) may have a terminal structure represented by the following formula (2):

(2)

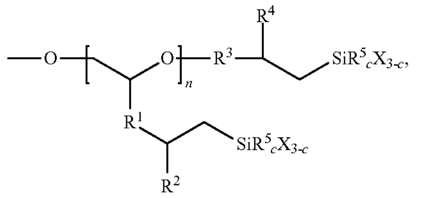

wherein $R^1$ and $R^3$ are each independently a divalent linkage group having 1 to 6 carbon atoms, atoms of $R^1$ and $R^3$ that are bonded to carbon atoms adjacent to $R^1$ and $R^3$ are each independently carbon, oxygen, or nitrogen, $R^2$ and $R^4$ are each independently hydrogen or a hydrocarbon group having 1 to 10 carbon atoms, n is an integer from 1 to 10, $R^5$ is a substituted or unsubstituted hydrocarbon group having 1 to 20 carbon atoms, X is a hydroxy group or a hydrolyzable group, and c is 0 or 1.

A fourth aspect of one or more embodiments of the present invention relates to a cured product of the curable composition.

A fifth aspect of one or more embodiments of the present invention relates to a method of producing a (meth)acrylic ester copolymer (B) having a reactive silicon group represented by the formula (1), the method including: copolymerizing a monomer component, wherein the monomer component includes: a (meth)acrylic ester (b1); a (meth) acrylic ester polymer (b2) having more than one (meth) acryloyl groups per molecule; and a chain transfer agent (b3) having a mercapto group, and the monomer component further includes a monomer (b4) having a reactive silicon group and a polymerizable unsaturated group, and/or the chain transfer agent (b3) having a mercapto group further has a reactive silicon group.

One or more embodiments of the present invention can provide: a reactive silicon group-containing (meth)acrylic ester copolymer that has a narrow molecular weight distribution and a low viscosity and that exhibits good physical properties (such as high elongation and strength) after curing; and a curable composition containing the copolymer. The reactive silicon group-containing (meth)acrylic ester copolymer according to one or more embodiments of the present invention includes a block copolymer and can have a narrow molecular weight distribution and have a relatively low viscosity despite having a high average molecular weight.

The reactive silicon group-containing (meth)acrylic ester copolymer according to one or more embodiments of the present invention can be combined with a reactive silicon group-containing polyoxyalkylene polymer to form a curable composition. The curable composition can give a cured product having high tensile strength and high bond strength.

A curable composition according to one or more embodiments of the present invention can exhibit high degree of thixotropy and is thus highly workable when applied to any object.

DETAILED DESCRIPTION OF THE EMBODIMENTS

Hereinafter, one or more embodiments of the present invention will be described in detail. One or more embodiments of the present invention are not limited to the embodiments described below.

<<Reactive Silicon Group-Containing (Meth)Acrylic Ester Copolymer (B)>>

The (meth)acrylic ester copolymer (B) has a reactive silicon group represented by the following formula (1) at a molecular chain end and/or in a side chain (non-terminal moiety).

$$—SiR^5_cX_{3-c} \quad (1)$$

In this formula, $R^5$ is a substituted or unsubstituted hydrocarbon group having 1 to 20 carbon atoms, Xis a hydroxy group or a hydrolyzable group, and c is 0 or 1.

The number of carbon atoms in the hydrocarbon group represented by $R^5$ may be from 1 to 10, from 1 to 5, or from 1 to 3. Specific examples of $R^5$ include methyl, ethyl, chloromethyl, methoxymethyl, and N,N-diethylaminomethyl groups. $R^5$ may be a methyl group or an ethyl group.

Examples of X include a hydroxy group, hydrogen, halogens, and alkoxy, acyloxy, ketoximate, amino, amide, acid amide, aminooxy, mercapto, and alkenyloxy groups. Among these, alkoxy groups such as methoxy and ethoxy groups are more preferred in terms of moderate hydrolyzability and ease of handling. Methoxy and ethoxy groups are particularly preferred.

Specific examples of the reactive silicon group of the (meth)acrylic ester copolymer (B) include, but are not limited to, trimethoxysilyl, triethoxysilyl, tris(2-propenyloxy)silyl, triacetoxysilyl, dimethoxymethylsilyl, diethoxymethylsilyl, dimethoxyethylsilyl, (chloromethyl) dimethoxysilyl, (chloromethyl)diethoxysilyl, (methoxymethyl)dimethoxysilyl, (methoxymethyl)diethoxysilyl, (N,N-diethylaminomethyl)dimethoxysilyl, and (N,N-diethylaminomethyl)diethoxysilyl groups. Among these, methyldimethoxysilyl, trimethoxysilyl, triethoxysilyl, (chloromethyl)dimethoxysilyl, (methoxymethyl)dimethoxysilyl, (methoxymethyl)diethoxysilyl, and (N,N-diethylaminomethyl)dimethoxysilyl groups are preferred since they exhibit high activity and allow for obtaining a cured product having good mechanical properties. In order to obtain a cured product having a high Young's modulus, trimethoxysilyl and triethoxysilyl groups are more preferred, and a trimethoxysilyl group is even more preferred.

The amount of the reactive silicon groups in the (meth) acrylic ester copolymer (B) is not limited to a particular range, but may be 0.06 mmol/g or more, 0.08 mmol/g or more, or 0.1 mmol/g or more. The amount of the reactive silicon groups may be 1.0 mmol/g or less. To prevent reduced elongation of the resulting cured product, the amount of the reactive silicon groups may be 0.5 mmol/g or less or 0.3 mmol/g or less.

In the case where the polyoxyalkylene polymer (A) and the (meth)acrylic ester copolymer (B) are mixed, the amount of the reactive silicon groups in the (meth)acrylic ester copolymer (B) is not limited to a particular range, but may be 0.2 mmol/g or more, 0.5 mmol/g or more, or 0.6 mmol/g or more. The amount of the reactive silicon groups may be 2.0 mmol/g or less. To prevent reduced elongation of the resulting cured product, the amount of the reactive silicon groups may be 1.0 mmol/g or less. To obtain a cured product having high stiffness and high flexibility, the amount of the reactive silicon groups may be from 0.5 to 1.0 mmol/g.

The (meth)acrylic ester copolymer (B) is a polymer formed by copolymerization of a monomer component including at least a (meth)acrylic ester (b1), a (meth)acrylic ester polymer (b2) having more than one (meth)acryloyl groups per molecule, and a chain transfer agent (b3) having a mercapto group. The term "(meth)acryl" as used herein means "acryl and/or methacryl".

The (meth)acrylic ester copolymer (B) has a reactive silicon group when either or both of the following two requirements are met.

Requirement 1: The monomer component further includes a monomer (b4) having a reactive silicon group and a polymerizable unsaturated group.

Requirement 2: The chain transfer agent (b3) having a mercapto group further has a reactive silicon group.

To obtain a cured product having high elongation, the amount of reactive silicon groups introduced as a result of Requirement 2 being met may be greater than the amount of reactive silicon groups introduced as a result of Requirement 1 being met. Specifically, the amount of reactive silicon groups introduced as a result of Requirement 1 being met may be 0.01 mmol/g or more, 0.03 mmol/g or more, or 0.05 mmol/g or more. The amount of the reactive silicon groups may be 1.0 mmol/g or less or 0.5 mmol/g or less. The amount of reactive silicon groups introduced as a result of Requirement 2 being met may be 0.2 mmol/g or more, 0.3 mmol/g or more, or 0.5 mmol/g or more. The amount of the reactive silicon groups may be 1.5 mmol/g or less or 1.0 mmol/g or less.

To obtain a cured product having high strength, it is preferable to introduce reactive silicon groups by meeting both of Requirements 1 and 2. Specifically, the amount of reactive silicon groups introduced as a result of Requirement 1 being met may be 0.1 mmol/g or more, 0.2 mmol/g or more, or 0.3 mmol/g or more. The amount of the reactive silicon groups may be 1.8 mmol/g or less or 1.0 mmol/g or less. The amount of reactive silicon groups introduced as a result of Requirement 2 being met may be 0.1 mmol/g or more, 0.2 mmol/g or more, or 0.3 mmol/g or more. The amount of the reactive silicon groups may be 1.5 mmol/g or less or 1.0 mmol/g or less.

((Meth)acrylic Ester (b1))

Examples of the (meth)acrylic ester (b1) include, but are not limited to, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth) acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth) acrylate, decyl (meth)acrylate, dodecyl (meth)acrylate, stearyl (meth)acrylate, phenyl (meth)acrylate, toluyl (meth) acrylate, benzyl (meth)acrylate, 2-methoxyethyl (meth) acrylate, 3-methoxybutyl (meth)acrylate, 2-hydroxyethyl (meth)acrylate, 2-hydroxypropyl (meth)acrylate, an ethylene oxide adduct of (meth)acrylic acid, 2,2,2-trifluoroethyl (meth)acrylate, 3,3,3-trifluoropropyl (meth)acrylate, 3,3,4,4,4-pentafluorobutyl (meth)acrylate, 2-perfluoroethyl-2-perfluorobutylethyl (meth)acrylate, trifluoromethyl (meth)acrylate, perfluoroethyl (meth)acrylate, bis(trifluoromethyl) methyl (meth)acrylate, 2-trifluoromethyl-2-perfluoroethylethyl (meth)acrylate, 2-perfluorohexylethyl (meth)acrylate, 2-perfluorodecylethyl (meth)acrylate, 2-perfluorohexadecylethyl (meth)acrylate, dimethylaminoethyl (meth)acrylate, chloroethyl (meth)acrylate, tetrahydrofurfuryl (meth)acrylate, glycidyl (meth)acrylate, and 2-aminoethyl (meth)acrylate. One (meth)acrylic ester may be used alone, or two or more (meth)acrylic esters may be used in combination.

The (meth)acrylic ester (b1) may be an alkyl (meth) acrylate.

In order to obtain a cured product having high strength, an alkyl (meth)acrylate in which the alkyl has 1 to 4 carbon atoms may be contained in an amount of 40 wt % or more, 45 wt % or more, or 50 wt % or more, relative to the total amount of the monomer component of the (meth)acrylic ester copolymer (B).

In order to form a hard polymer, the (meth)acrylic ester (b1) may include 60 wt % or more of at least one monomer selected from the group consisting of a methacrylic ester, isobornyl acrylate, dicyclopentenyl acrylate, and dicyclopentanyl acrylate.

In order to ensure both high flexibility and high stiffness, the content of the (meth)acrylic ester (b1) may be 40 wt % or more, 45 wt % or more, 50 wt % or more, 55 wt % or more, or 60 wt % or more, relative to the total amount of the monomer component of the (meth)acrylic ester copolymer (B). In terms of retention of adhesion, the content of the (meth)acrylic ester (b1) may be 50 wt % or more, 55 wt % or more, or 60 wt % or more relative to the total amount of the monomers of the (meth)acrylic ester copolymer (B). In order to ensure compatibility with the polyoxyalkylene polymer (A), the content of the (meth)acrylic ester (b1) may be 60 wt % or more or 70 wt % or more.

((Meth)acrylic Ester Polymer (b2) Having More Than One (Meth)acryloyl Groups per Molecule)

Although being a polymer in itself, the (meth)acrylic ester polymer (b2) is copolymerizable with another monomer such as the (meth)acrylic ester (b1) by virtue of having (meth)acryloyl groups, and serves as one of the monomers of the (meth)acrylic ester copolymer (B). Additionally, the (meth)acrylic ester polymer (b2) can function as a so-called polyfunctional macromonomer since it has more than one (meth)acryloyl groups per molecule. In the (meth)acrylic ester copolymer (B), the backbone of the (meth)acrylic ester polymer (b2) (second molecular chain described later) can form a structure crosslinking two molecular chains (first molecular chains described later) each of which is composed of a polymer of the (meth)acrylic ester (b1) etc. The (meth) acrylic ester polymer (b2) may be referred to as a "polyfunctional macromonomer (b2)" hereinafter.

The backbone of the polyfunctional macromonomer (b2) is a (meth)acrylic ester polymer. The monomer forming the backbone of the polyfunctional macromonomer (b2) is not limited to a particular (meth)acrylic compound, and various (meth)acrylic monomers can be used. Examples of the (meth)acrylic monomers include (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth) acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, stearyl (meth)acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, an ethylene oxide adduct of (meth)acrylic acid, 2,2,2-trifluoroethyl (meth)acrylate, 3,3,3-trifluoropropyl (meth)acrylate, 3,3,4,4,4-pentafluorobutyl (meth)acrylate, 2-perfluoroethyl-2-perfluorobutylethyl (meth)acrylate, trifluoromethyl (meth)acrylate, perfluoroethyl (meth)acrylate, bis(trifluoromethyl)methyl (meth)

acrylate, 2-trifluoromethyl-2-perfluoroethylethyl (meth) acrylate, 2-perfluorohexylethyl (meth)acrylate, 2-perfluorodecylethyl (meth)acrylate, 2-perfluorohexadecylethyl (meth)acrylate, dimethylaminoethyl (meth)acrylate, chloroethyl (meth)acrylate, tetrahydrofurfuryl (meth)acrylate, glycidyl (meth)acrylate, and 2-aminoethyl (meth)acrylate.

An additional monomer copolymerizable with the (meth) acrylic monomer as mentioned above may be used. Examples of the additional monomer include: styrene monomers such as styrene, vinyltoluene, α-methylstyrene, chlorostyrene, and styrenesulfonic acid; fluorine-containing vinyl monomers such as perfluoroethylene, perfluoropropylene, and vinylidene fluoride; maleic acid; maleic acid derivatives such as maleic anhydride, monoalkyl maleates, and dialkyl maleates; fumaric acid; fumaric acid derivatives such as monoalkyl fumarates and dialkyl fumarates; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; vinyl ester monomers such as vinyl acetate, vinyl propionate, vinyl pivalate, vinyl benzoate, and vinyl cinnamate; olefin monomers such as ethylene and propylene; conjugated diene monomers such as butadiene and isoprene; (meth)acrylamide; (meth)acrylonitrile; and vinyl monomers such as vinyl chloride, vinylidene chloride, allyl chloride, allyl alcohol, ethyl vinyl ether, and butyl vinyl ether. One of these additional monomers may be used alone, or two or more thereof may be used in combination.

The backbone of the polyfunctional macromonomer (b2) may be composed of a soft polymer. Specifically, the monomer component forming the backbone of the polyfunctional macromonomer (b2) may include 60 wt % or more of an acrylic ester (other than isobornyl acrylate, dicyclopentenyl acrylate, and dicyclopentanyl acrylate).

The (meth)acryloyl groups of the polyfunctional macromonomer (b2) may be represented by the following formula (7).

$$CH_2{=}C(R^8)\text{—}COO\text{—}Z \quad (7)$$

In this formula, $R^8$ is hydrogen or a methyl group, and Z is the backbone of the polyfunctional macromonomer (b2).

The polyfunctional macromonomer (b2) has more than one (meth)acryloyl groups on average per molecule. The number of (meth)acryloyl groups may be from 1.1 to 5, from 1.3 to 4, from 1.6 to 2.5, or from 1.8 to 2.0 on average per molecule of the polyfunctional macromonomer (b2). The polyfunctional macromonomer (b2) may have only acryloyl groups, only methacryloyl groups, or both acryloyl and methacryloyl groups as (meth)acryloyl groups.

The polyfunctional macromonomer (b2) may have a (meth)acryloyl group at a molecular chain end of a (meth) acrylic ester polymer, in a side chain of the (meth)acrylic ester polymer, or both at the molecular chain end and in the side chain. In order to achieve good mechanical properties, the polyfunctional macromonomer (b2) may have a (meth) acryloyl group at the molecular chain end. The polyfunctional macromonomer (b2) may particularly have a (meth) acryloyl group at each of the two ends of the molecular chain of the (meth)acrylic ester polymer.

The method of introducing (meth)acryloyl groups into the polyfunctional macromonomer (b2) is not limited to a particular technique. For example, either of the methods listed below can be used. These methods may be used in combination.

(iv) A method in which a monomer having a reactive functional group (V group) is copolymerized with a (meth) acrylic monomer (examples of the monomer having a reactive functional group include acrylic acid and 2-hydroxyethyl acrylate) and then the resulting copolymer is reacted with a compound having a (meth)acryloyl group and a functional group reactive with the V group (examples of this compound include 2-isocyanatoethyl (meth)acrylate).

(v) A method in which a (meth)acrylic monomer is polymerized by living radical polymerization and then a (meth)acryloyl group is introduced at a molecular chain end (preferably at each of the two ends of the molecular chain) of the resulting (meth)acrylic polymer.

Of these methods, the method (v) is preferred because with this method a (meth)acryloyl group can be introduced at a molecular chain end. Examples of the "living radical polymerization" include: living radical polymerization using a cobalt porphyrin complex as taught in *Journal of the American Chemical Society* (*J. Am. Chem. Soc.*), 1994, vol. 116, p. 7943; living radical polymerization using nitroxide radicals as taught in Japanese Laid-Open Patent Application Publication (Translation of PCT Application) No. 2003-500378; and atom-transfer radical polymerization (ATRP) using an organic halide or a halogenated sulfonyl compound as an initiator and a transition metal complex as a catalyst as taught in Japanese Laid-Open Patent Application Publication No. H11-130931. The atom-transfer radical polymerization is most preferred because with this polymerization a (meth)acryloyl group can easily be introduced at a molecular chain end.

A method may also be employed in which a (meth)acrylic polymer is obtained using a metallocene catalyst and a thiol compound having at least one reactive silicon group in the molecule as taught in Japanese Laid-Open Patent Application Publication No. 2001-040037.

The number-average molecular weight of the polyfunctional macromonomer (b2) is not limited to a particular range. In order to ensure both the adhesion of the curable composition and the ease of handling of the polyfunctional macromonomer (b2), the number-average molecular weight of the polyfunctional macromonomer (b2) may be 500 or more, 1,000 or more, or 2,000 or more. The number-average molecular weight may be 100,000 or less, 50,000 or less, 40,000 or less, 30,000 or less, 15,000 or less, or 10,000 or less. In order to increase the strength of the cured product and improve the thixotropy of the curable composition, the number-average molecular weight of the polyfunctional macromonomer (b2) may be 8,000 or less, 6,000 or less, or 5,000 or less.

The polyfunctional macromonomer (b2) is not limited to having a particular molecular weight distribution (weight-average molecular weight (Mw)/number-average molecular weight (Mn)), but may have a narrow molecular distribution. To be specific, the dispersity Mw/Mn may be less than 2.0, 1.6 or less, 1.5 or less, 1.4 or less, or 1.3 or less.

The number-average molecular weight (Mn) and weight-average molecular weight (Mw) of the polyfunctional macromonomer (b2) are measured by GPC (polystyrene equivalent). The details of the measurement method will be described in Examples.

The (meth)acrylic ester copolymer (B) includes a molecular chain composed of a polymer of the (meth)acrylic ester (b1) etc. and a molecular chain derived from the backbone of the polyfunctional macromonomer (b2). Since the polyfunctional macromonomer (b2) has more than one (meth)acryloyl groups which are polymerizable groups per molecule, the (meth)acrylic ester copolymer (B) has a structure in which more than one molecular chains each composed of a polymer of the (meth)acrylic ester (b1) etc. are bonded to one molecular chain of the polyfunctional macromonomer (b2). The molecular chain of the polyfunctional macromonomer (b2) may be introduced at an end of a molecular chain composed of a polymer of the (meth)acrylic ester (b1) etc. or in a side chain of the molecular chain. In terms of adhesion, the molecular chain of the polyfunctional macromonomer (b2) may be introduced in a side chain of a molecular chain composed of a polymer of the (meth)acrylic ester (b1) etc.

In particular, in the case where the polyfunctional macromonomer (b2) has (meth)acryloyl groups at both ends of a molecular chain of a (meth)acrylic ester polymer, an H-shaped structure can be formed in which molecular chains each composed of a polymer of the (meth)acrylic ester (b1) etc. are bonded to both ends of the molecular chain of the polyfunctional macromonomer (b2). The molecular chain of the polyfunctional macromonomer (b2) corresponds to the horizontal bar of "H", and the molecular chains each composed of a polymer of the (meth)acrylic ester (b1) etc. correspond to the two vertical bars of "H".

The content of the polyfunctional macromonomer (b2) may be from 1 to 60 wt %, from 5 to 50 wt %, or from 10 to 40 wt % relative to the total amount of the monomer component of the (meth)acrylic ester copolymer (B). In particular, when it is desirable for a cured product of the (meth)acrylic ester copolymer (B) to have a high Young's modulus, the content of the polyfunctional macromonomer (b2) may be less than 35 wt %. When it is desirable for a cured product of the (meth)acrylic ester copolymer (B) to have a low Young's modulus, the content of the polyfunctional macromonomer (b2) may be 35 wt % or more. The polyfunctional macromonomer (b2) may constitute 0.2 to 5.0 mol %, 0.6 to 2.3 mol %, or 0.8 to 2.1 mol %, of the monomer component of the (meth)acrylic ester copolymer (B). When the content of the polyfunctional macromonomer (b2) is within the range as described above, the effect of the polyfunctional macromonomer (b2) can be achieved while gelation is prevented during synthesis of the (meth)acrylic ester copolymer (B).

The number of the molecules of the polyfunctional macromonomer (b2) in the (meth)acrylic ester copolymer (B) may be 0.01 or more, 0.03 or more, or 0.05 or more on average per molecule of the (meth)acrylic ester copolymer (B). The average number of the molecules of the polyfunctional macromonomer (b2) may be 2.0 or less, 1.5 or less, or 1.3 or less.

(Chain Transfer Agent (b3) Having Mercapto Group)

The inclusion of the chain transfer agent (b3) having a mercapto group in the monomer component of the (meth) acrylic ester copolymer (B) can narrow the molecular weight distribution of the (meth)acrylic ester copolymer (B) and prevent gelation during synthesis of the (meth)acrylic ester copolymer (B), despite the use of the polyfunctional macromonomer (b2). Additionally, the inclusion of the chain transfer agent (b3) allows for preferential synthesis of a polymer molecule in which one molecule of the polyfunctional macromonomer (b2) is introduced in one molecule of the (meth)acrylic ester copolymer (B).

The chain transfer agent (b3) having a mercapto group may have no reactive silicon group, but may further have a reactive silicon group. When the chain transfer agent (b3) having a mercapto group further has a reactive silicon group, the reactive silicon group can be introduced at an end of a molecular chain composed of a polymer of the (meth)acrylic ester (b1) etc.

Examples of the chain transfer agent (b3) having a mercapto group include, but are not limited to, 3-mercaptopropyldimethoxymethylsilane, 3-mercaptopropyltrimethoxysilane, (mercaptomethyl)dimethoxymethylsilane, (mercaptomethyl)trimethoxysilane, n-dodecyl mercaptan, tert-dodecyl mercaptan, and lauryl mercaptan.

The content of the chain transfer agent (b3) having a mercapto group may be from 0.1 to 10 wt %, from 0.3 to 7 wt %, or from 0.5 to 5 wt % relative to the total amount of the monomer component of the (meth)acrylic ester copolymer (B). The chain transfer agent (b3) having a mercapto group may constitute 0.1 to 15 mol %, 0.4 to 10 mol %, 0.5 to 9 mol %, or 0.5 to 8 mol %, of the monomer component of the (meth)acrylic ester copolymer (B). The effect of the chain transfer agent (b3) having a mercapto group can be achieved when the content of the chain transfer agent (b3) is within the range as described above.

In the case where the polyoxyalkylene polymer (A) and the (meth)acrylic copolymer (B) are mixed, the content of the chain transfer agent (b3) having a mercapto group may be from 1 to 30 wt %, from 3 to 20 wt %, or from 5 to 15 wt % relative to the total amount of the monomer component of the (meth)acrylic ester copolymer (B). The chain transfer agent (b3) having a mercapto group may constitute 0.4 to 18 mol %, 0.4 to 15 mol %, 2 to 15 mol %, or 4 to 12 mol %, of the monomer component of the (meth)acrylic ester copolymer (B). The effect of the chain transfer agent (b3) having a mercapto group can be achieved when the content of the chain transfer agent (b3) is within the range as described above.

In order to increase the graft ratio of the polyfunctional macromonomer (b2), the content of the polyfunctional macromonomer (b2) and the content of the chain transfer agent (b3) having a mercapto group may be adjusted such that the molar ratio of the (meth)acrylic ester polymer (b2) to the chain transfer agent (b3) having a mercapto group is 0.12 or more. The molar ratio may be 0.15 or more or 0.20 or more.

(Monomer (b4) Having Reactive Silicon Group and Polymerizable Unsaturated Group)

The monomer (b4) having a reactive silicon group and a polymerizable unsaturated group is an optional monomer. The monomer (b4) need not be used, but may be used. The use of the monomer (b4) allows for introduction of a reactive silicon group in a side chain (non-terminal moiety) of a molecular chain composed of a polymer of the (meth)acrylic ester (b1) etc.

Examples of the monomer (b4) having a reactive silicon group and a polymerizable unsaturated group include: compounds having a (meth)acryloxy group and a reactive silicon group, such as 3-(meth)acryloxypropyltrimethoxysilane, 3-(meth)acryloxypropyltriethoxysilane, 3-(meth)acryloxypropyldimethoxymethylsilane, (meth)acryloxymethyltrimethoxysilane, and (meth)acryloxymethyldimethoxymethylsilane; and compounds having a vinyl group and a reactive silicon group, such as vinyltrimethoxysilane and vinyltriethoxysilane. One of these compounds may be used alone, or two or more thereof may be used in combination.

In the case of using the monomer (b4), the content of the monomer (b4) may be from 0.1 to 50 wt %, from 0.3 to 30 wt %, or from 0.5 to 20 wt % relative to the total amount of the monomer component of the (meth)acrylic ester copolymer (B). In order to improve the thixotropy of the curable composition and obtain a cured product having high elongation, the content of the monomer (b4) may be 10 wt % or less, 5 wt % or less, or 3 wt % or less.

The monomer component of the (meth)acrylic ester copolymer (B) may or may not include another monomer that is not categorized as any of the compounds (b1) to (b4) described in detail above. Examples of the other monomer include (meth)acrylic monomers that are not categorized as the (meth)acrylic ester (b1) and monomers other than the (meth)acrylic monomers. Specifically, the monomers mentioned as examples of the additional monomer for the polyfunctional macromonomer (b2) can be used.

The method of polymerizing the compounds (b1) to (b4) to form the (meth)acrylic ester copolymer (B) is not limited to a particular technique, and may be common free-radical polymerization. In the present embodiment, even with the use of free-radical polymerization, the polymerization is controllable, and the (meth)acrylic ester copolymer (B) can be produced as a block copolymer. There is also an advantage in that the molecular weight distribution of the (meth) acrylic ester copolymer (B) can be narrowed.

Examples of polymerization initiators usable in the free-radical polymerization include: azo compounds such as 2,2'-azobis(2-methylbutyronitrile), dimethyl 2,2'-azobis(2-methylpropionate), 2,2'-azobis(2,4-dimethylvaleronitrile), 2,2'-azobis(4-methoxy-2,4-dimethylvaleronitrile), 2,2'-azobis[N-(2-propenyl)-2-methylpropionamide], and 1,1'-azobis (cyclohexane-1-carbonitrile); diacyl peroxides such as benzoyl peroxide, isobutyryl peroxide, isononanoyl peroxide, decanoyl peroxide, lauroyl peroxide, p-chlorobenzoyl peroxide, and di(3,5,5-trimethylhexanoyl) peroxide; peroxydicarbonates such as diisopropyl perdicarbonate, di-sec-butyl perdicarbonate, di-2-ethylhexyl perdicarbonate, di-1-methylheptyl perdicarbonate, di-3-methoxybutyl perdicarbonate, and dicyclohexyl perdicarbonate; peroxyesters such as tert-butyl perbenzoate, tert-butyl peracetate, tert-butyl per-2-ethylhexanoate, tert-butyl perisobutyrate, tert-butyl perpivalate, tert-butyl diperadipate, and cumyl perneodecanoate; ketone peroxides such as methyl ethyl ketone peroxide and cyclohexanone peroxide; dialkyl peroxides such as di-tert-butyl peroxide, dicumyl peroxide, tert-butyl cumyl peroxide, and 1,1-di(tert-hexylperoxy)-3,3,5-trimethylcyclohexane; hydroperoxides such as cumene hydroperoxide and tert-butyl hydroperoxide; and peroxides such as 1,1-di(tert-hexylperoxy)-3,3,5-trimethylcyclohexane. One of these polymerization initiators may be used alone, or two or more thereof may be used in combination.

Examples of solvents usable in the free-radical polymerization include: aromatic solvents such as toluene, xylene, styrene, ethylbenzene, p-dichlorobenzene, di-2-ethylhexyl phthalate, and di-n-butyl phthalate; aliphatic hydrocarbon solvents such as hexane, heptane, octane, cyclohexane, and methylcyclohexane; carboxylic ester compounds such as butyl acetate, n-propyl acetate, and isopropyl acetate; ketone compounds such as methyl isobutyl ketone and methyl ethyl ketone; dialkyl carbonate compounds such as dimethyl carbonate and diethyl carbonate; and alcohol compounds such as n-propanol, 2-propanol, n-butanol, 2-butanol, isobutanol, tert-butanol, and amyl alcohol. Among these, the alcohol compounds are preferred in that the use of any of the alcohol compounds leads to a narrow molecular weight distribution. The aromatic solvents are preferred in that they have high dissolving power. The aliphatic hydrocarbon solvents are preferred in that they have a low level of odor. The molecular weight distribution is influenced by the amount of the chain transfer agent (b3) added and the solvent.

In the case where the amount of the chain transfer agent (b3) added is 3 wt % or less, the molecular weight distribution is influenced largely by the type of the solvent. When a (meth)acrylic ester copolymer having a narrow molecular weight distribution is desired, it is preferable to use isobutanol.

The number-average molecular weight of the (meth) acrylic ester copolymer (B) is not limited to a particular range. The number-average molecular weight as determined by GPC analysis as a polystyrene-equivalent molecular weight may be from 500 to 50,000, from 500 to 30,000, or from 1,000 to 10,000. In particular, the number-average molecular weight may be 7,000 or less in order to obtain the (meth)acrylic ester copolymer (B) with low viscosity.

In order to achieve low viscosity and high adhesion when the (meth)acrylic ester copolymer (B) is mixed with the polyoxyalkylene polymer (A), the number-average molecular weight of the (meth)acrylic ester copolymer (B) may be 3,500 or less.

The weight-average molecular weight of the (meth) acrylic ester copolymer (B) is not limited to a particular range. The weight-average molecular weight as determined by GPC analysis as a polystyrene-equivalent molecular weight may be from 500 to 80,000, from 3,000 to 70,000, or from 5,000 to 65,000. In particular, the weight-average molecular weight may be 30,000 or more in order to achieve good mechanical properties. In order to achieve low viscosity and obtain a cured product having high strength when the (meth)acrylic ester copolymer (B) is mixed with the polyoxyalkylene polymer (A), the weight-average molecular weight of the (meth)acrylic ester copolymer (B) may be 15,000 or less.

The (meth)acrylic ester copolymer (B) is not limited to having a particular molecular weight distribution. For the (meth)acrylic ester copolymer (B) to have low viscosity, the dispersity may be from 3.0 to 11.0, from 3.2 to 10.0, or from 3.4 to 8.0. The molecular weight distribution of the (meth) acrylic ester copolymer (B) can be determined from the number-average molecular weight and weight-average molecular weight obtained by GPC analysis.

The use of the monomer (b4) having a reactive silicon group and a polymerizable unsaturated group or the use of the chain transfer agent (b3) having a reactive silicon group in addition to a mercapto group leads to the (meth)acrylic ester copolymer (B) having a reactive silicon group. The monomer (b4) and the chain transfer agent (b3) having a reactive silicon group in addition to a mercapto group may be used in combination. With the use of the monomer (b4) having a reactive silicon group and a polymerizable unsaturated group, the reactive silicon group can be randomly introduced in a side chain of a molecular chain composed of a polymer of the (meth)acrylic ester (b1) etc. With the use of the chain transfer agent (b3) having a reactive silicon group in addition to a mercapto group, the reactive silicon group can be introduced at an end of a molecular chain composed of a polymer of the (meth)acrylic ester (b1) etc.

The following methods can also be used to further introduce reactive silicon groups into the (meth)acrylic ester copolymer (B).

(vi) A method in which a monomer having a reactive functional group (V group) is copolymerized with other monomers such as the (meth)acrylic ester (b1) and then the resulting copolymer is reacted with a compound having a reactive silicon group and a functional group reactive with the V group. Specific examples of the method (vi) include: a method in which 2-hydroxyethyl acrylate is copolymerized and then the resulting copolymer is reacted with an isocyanatosilane compound having a reactive silicon group; and a method in which glycidyl acrylate is copolymerized and then the resulting copolymer is reacted with an aminosilane compound having a reactive silicon group.

(vii) A method in which terminal functional groups of a (meth)acrylic ester copolymer synthesized by living radical polymerization are modified to introduce reactive silicon groups. A (meth)acrylic ester copolymer resulting from living radical polymerization permits easy introduction of functional groups at the ends of the polymer. The reactive silicon groups can be introduced at the ends of the polymer by modifying the introduced functional groups.

Examples of compounds that can be used in the method (vi) as the compound having a reactive silicon group and a functional group reactive with the V group include: isocyanatosilane compounds such as 3-isocyanatopropyldimethoxymethylsilane, 3-isocyanatopropyltrimethoxysilane, 3-isocyanatopropyltriethoxysilane, isocyanatomethyldimethoxymethylsilane, isocyanatomethyltrimethoxysilane, and isocyanatomethyltriethoxysilane; epoxysilane compounds such as 3-glycidoxypropyldimethoxymethylsilane, 3-glycidoxypropyltrimethoxysilane, 3-glycidoxypropyltriethoxysilane, glycidoxymethyldimethoxymethylsilane, glycidoxymethyltrimethoxysilane, and glycidoxymethyltriethoxysilane; and aminosilane compounds such as 3-aminopropyldimethoxymethylsilane, 3-aminopropyltrimethoxysilane, 3-aminopropyltriethoxysilane, aminomethyldimethoxymethylsilane, aminomethyltrimethoxysilane, aminomethyltriethoxysilane, N-cyclohexylaminomethyldimethoxymethylsilane, N-cyclohexylaminomethyltrimethoxysilane, and N-cyclohexylaminomethyltriethoxysilane.

In the method (vii), any modification reaction can be used. Examples of the modification reaction method include: a method using a compound having a reactive silicon group and a reactive group reactive with a terminal functional group resulting from living radical polymerization; and a method in which double bonds are introduced at the ends of the polymer using a double bond-containing compound having a reactive group reactive with the terminal functional group and subsequently reactive silicon groups are introduced through a process such as a hydrosilylation reaction.

The reactive silicon group-containing (meth)acrylic ester copolymer (B) according to a preferred aspect may include a triblock copolymer. The triblock copolymer can have a structure described below.

That is, the reactive silicon group-containing (meth) acrylic ester copolymer (B) may include a structure in which two first molecular chains are bonded to each other via one second molecular chain. Each of the first and second molecular chains includes a molecular chain of a (meth) acrylic ester copolymer.

The first molecular chain is a molecular chain formed by copolymerization of the (meth)acrylic ester (b1), the (meth) acryloyl groups of the polyfunctional macromonomer (b2), the chain transfer agent (b3), and the monomer (b4). The reactive silicon group is bonded to the first molecular chain. In the case where the chain transfer agent (b3) having a mercapto group further has a reactive silicon group, the reactive silicon group is bonded to an end of the first molecular chain. In the case of using the monomer (b4) having a reactive silicon group and a polymerizable unsaturated group, the reactive silicon group is bonded to a non-terminal moiety of the first molecular chain.

The second molecular chain corresponds to a (meth) acrylic ester polymer backbone in the polyfunctional macromonomer (b2).

The way in which the two first molecular chains and the one second molecular chain are bonded is different from that in common ABA triblock copolymers. Specifically, both ends of the second molecular chain are bonded to a non-terminal moiety of one of the first molecular chains and a non-terminal moiety of the other first molecular chain, respectively. That is, the triblock copolymer includes an H-shaped structure, in which the two vertical bars of "H" correspond to the two first molecular chains, and the horizontal bar of "H" corresponds to the one second molecular chain.

The reactive silicon group-containing (meth)acrylic ester copolymer (B) is not limited to the triblock copolymer having the H-shaped structure, and may include a block copolymer having another structure in addition to the triblock copolymer having the H-shaped structure. Examples of the block copolymer having a structure other than the H-shaped structure include a block copolymer having a structure in which three first molecular chains are bonded to one another via two second molecular chains.

The first and second molecular chains are bonded via an ester bond derived from the (meth)acryloyl group of the polyfunctional macromonomer (b2) (i.e., an ester bond corresponding to the ester bond in the formula (7) given above).

A copolymer in which the first molecular chain is composed of a hard polymer and the second molecular chain is composed of a soft polymer is preferred in that the use of such a copolymer can result in a cured product having high strength and high elongation. The term "hard polymer" as used herein refers to a polymer having a high glass transition temperature, and the term "soft polymer" as used herein refers to a polymer having a low glass transition temperature. Specifically, the monomer component ((b1) and (b4)) of the first molecular chain may include at least one monomer selected from the group consisting of a methacrylic ester, isobornyl acrylate, dicyclopentenyl acrylate, and dicyclopentanyl acrylate. The at least one monomer may constitute 60 wt % or more, or 70 wt % or more, of the monomer component of the first molecular chain.

The monomer component of the second molecular chain (monomer component forming a (meth)acrylic ester polymer backbone in the macromonomer (b2)) may include an acrylic ester (other than isobornyl acrylate, dicyclopentenyl acrylate, and dicyclopentanyl acrylate). The acrylic ester may constitute 60 wt % or more, or 70 wt % or more, of the monomer component of the second molecular chain.

The first molecular chain is a molecular chain formed as a result of a reaction of the chain transfer agent (b3) having a mercapto group. Thus, the first molecular chain can have, at either end thereof, a substituent derived from the chain transfer agent (b3), in particular a structure represented by —S—R. In this formula, S is a sulfur atom and R is a hydrocarbon group optionally having a reactive silicon group. Examples of the hydrocarbon group include alkyl, aryl, and aralkyl groups having up to 20 carbon atoms. The reactive silicon group is one represented by the formula (1) described above. Specific examples of R include a reactive silicon group-containing methyl group, a reactive silicon group-containing propyl group, a n-dodecyl group, a tert-dodecyl group, and a lauryl group.

The reactive silicon group-containing (meth)acrylic ester copolymer (B), which can have a substituent derived from the chain transfer agent (b3) having a mercapto group, can contain a sulfur atom. The sulfur atom concentration in the (meth)acrylic ester copolymer (B) may be from 700 to 20,000 ppm or from 1,000 to 15,000 ppm.

<<Curable Composition>>

One or more embodiments of the present invention relate to a curable composition containing the reactive silicon group-containing (meth)acrylic ester copolymer (B) as described in detail above. The curable composition may contain only the (meth)acrylic ester copolymer (B) as a reactive silicon group-containing polymer or may contain a polyoxyalkylene polymer (A) having a reactive silicon group in addition to the (meth)acrylic ester copolymer (B).

<<Polyoxyalkylene Polymer (A) Having Reactive Silicon Group>>

<Reactive Silicon Group>

The polyoxyalkylene polymer (A) has a reactive silicon group represented by the formula (1) given above. The reactive silicon group of the polyoxyalkylene polymer (A) may be the same or different from the reactive silicon group of the (meth)acrylic ester copolymer (B).

The number of carbon atoms in the hydrocarbon group represented by $R^5$ may be from 1 to 10, from 1 to 5, or from 1 to 3. Specific examples of $R^5$ include methyl, ethyl, chloromethyl, methoxymethyl, and N,N-diethylaminomethyl groups. $R^5$ may be a methyl group, an ethyl group, a chloromethyl group, or a methoxymethyl group, or a methyl group or a methoxymethyl group.

Examples of X include a hydroxy group, halogens, and alkoxy, acyloxy, ketoximate, amino, amide, acid amide, aminooxy, mercapto, and alkenyloxy groups. Among these, alkoxy groups such as methoxy and ethoxy groups are more preferred in terms of moderate hydrolyzability and ease of handling. Methoxy and ethoxy groups are particularly preferred.

Specific examples of the reactive silicon group of the polyoxyalkylene polymer (A) include, but are not limited to, trimethoxysilyl, triethoxysilyl, tris(2-propenyloxy)silyl, triacetoxysilyl, dimethoxymethylsilyl, diethoxymethylsilyl, dimethoxyethylsilyl, (chloromethyl)dimethoxysilyl, (chloromethyl)diethoxysilyl, (methoxymethyl)dimethoxysilyl, (methoxymethyl)diethoxysilyl, (N,N-diethylaminomethyl) dimethoxysilyl, and (N,N-diethylaminomethyl)diethoxysilyl groups. Among these, methyldimethoxysilyl, trimethoxysilyl, triethoxysilyl, (chloromethyl)dimethoxysilyl, (methoxymethyl)dimethoxysilyl, (methoxymethyl)diethoxysilyl, and (N,N-diethylaminomethyl)dimethoxysilyl groups are preferred since they exhibit high activity and allow for obtaining a cured product having good mechanical properties. In order to obtain a cured product having high stiffness, trimethoxysilyl and triethoxysilyl groups are more preferred, and a trimethoxysilyl group is even more preferred.

The polyoxyalkylene polymer (A) may have one or less reactive silicon groups on average per terminal moiety or may have more than one reactive silicon groups on average per terminal moiety.

Hereinafter, the polyoxyalkylene polymer (A) that has more than one reactive silicon groups on average per terminal moiety will be described. Having more than one reactive silicon groups on average per terminal moiety means that the polyoxyalkylene polymer (A) includes a polyoxyalkylene having two or more reactive silicon groups in one terminal moiety. That is, the polyoxyalkylene polymer (A) may include only a polyoxyalkylene having two or more reactive silicon groups in one terminal moiety or may include both a polyoxyalkylene having two or more reactive silicon groups in one terminal moiety and a polyoxyalkylene having one reactive silicon group in one terminal moiety. Terminal moieties of one molecule of the polyoxyalkylene may include both a terminal moiety having two or more reactive silicon groups and a terminal moiety having one reactive silicon group. Although the polyoxyalkylene polymer (A) as a whole has more than one reactive silicon groups on average per terminal moiety, the polyoxyalkylene polymer (A) may include a polyoxyalkylene having a terminal moiety having no reactive silicon group.

The terminal moiety having two or more reactive silicon groups can be represented, for example, by the following formula (2).

[Chem 2]

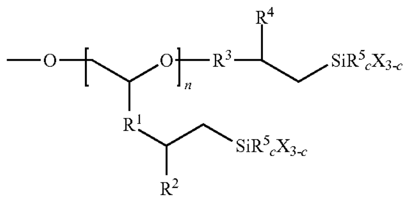

(2)

In the formula, $R^1$ and $R^3$ are each independently a divalent linkage group having 1 to 6 carbon atoms, atoms of $R^1$ and $R^3$ that are bonded to carbon atoms adjacent to $R^1$ and $R^3$ are each independently carbon, oxygen, or nitrogen, $R^2$ and $R^4$ are each independently hydrogen or a hydrocarbon group having 1 to 10 carbon atoms, n is an integer from 1 to 10, and $R^5$, X, and c are as defined above for the formula (1).

$R^1$ and $R^3$ may each independently be a divalent organic group having 1 to 6 carbon atoms or a hydrocarbon group optionally containing an oxygen atom. The number of carbon atoms in the hydrocarbon group may be from 1 to 4, from 1 to 3, or 1 or 2. Specific examples of $R^1$ include $CH_2OCH_2$, $CH_2O$, and $CH_2$, and $R^1$ may be $CH_2OCH_2$. Specific examples of $R^3$ include $CH_2$ and $CH_2CH_2$, and $R^3$ may be $CH_2$.

The number of carbon atoms in the hydrocarbon group represented by $R^2$ or $R^4$ may be from 1 to 5, from 1 to 3, or 1 or 2. Specific examples of $R^2$ and $R^4$ include a hydrogen atom, a methyl group, and an ethyl group, and $R^2$ and $R^4$ may be hydrogen atoms or methyl groups, or hydrogen atoms.

In a particularly preferred aspect, the terminal moiety represented by the formula (2) contains $CH_2OCH_2$ as $R^1$, $CH_2$ as $R^3$, and hydrogen atoms as $R^2$ and $R^4$. The integer n may be from 1 to 5, from 1 to 3, or 1 or 2. It should be noted that n is not limited to one value and terminal moieties having different values of n may be present.

The polyoxyalkylene polymer (A) may have 1.0 or less reactive silicon groups on average per terminal moiety, but may have more than 1.0 reactive silicon groups on average per terminal moiety. The average number of reactive silicon groups may be 1.1 or more, 1.5 or more, or 2.0 or more. The average number may be 5 or less or 3 or less.

In the polyoxyalkylene polymer (A), the number of terminal moieties having more than one reactive silicon groups may be 0.5 or more, 1.0 or more, 1.1 or more, or 1.5 or more on average per molecule of the polyoxyalkylene polymer (A). The average number may be 4 or less or 3 or less.

The polyoxyalkylene polymer (A) may have a reactive silicon group other than those in the terminal moieties. However, it is preferable that the polyoxyalkylene polymer (A) should have reactive silicon groups only in the terminal moieties, because in this case a rubbery cured product that exhibits high elongation and low elastic modulus is likely to be obtained.

In the polyoxyalkylene polymer (A), the average number of reactive silicon groups per molecule may be more than 1.0, 1.2 or more, 1.3 or more, 1.5 or more, or 1.7 or more in terms of the strength of the cured product. The average number may be 6.0 or less, 5.5 or less, or 5.0 or less in terms of the elongation of the cured product.

<Main Chain Structure>

The polyoxyalkylene polymer (A) is not limited to having a particular backbone, and examples of the backbone of the polyoxyalkylene polymer (A) include polyoxyethylene, polyoxypropylene, polyoxybutylene, polyoxytetramethylene, polyoxyethylene-polyoxypropylene copolymer, and polyoxypropylene-polyoxybutylene copolymer. Among these, polyoxypropylene is preferred.

The number-average molecular weight of the polyoxyalkylene polymer (A), as determined by GPC analysis as a polystyrene equivalent molecular weight, may be from 3,000 to 100,000, from 3,000 to 50,000, or from 3,000 to 30,000. If the number-average molecular weight is less than 3,000, the amount of introduced reactive silicon groups is large, and this could be disadvantageous in terms of production cost. If the number-average molecular weight is more than 100,000, the polymer has a high viscosity, which tends to be disadvantageous in terms of workability.

The molecular weight of the polyoxyalkylene polymer (A) can be expressed also as a terminal group equivalent molecular weight. The terminal group equivalent molecular weight is determined as follows: before introduction of reactive silicon groups, an organic polymer precursor is subjected to titration analysis based on the principles of the hydroxy value measurement method as specified in JIS K 1557 and the iodine value measurement method as specified in JIS K 0070 to directly measure the terminal group concentration, from which the terminal group equivalent molecular weight is calculated taking into account the architecture of the organic polymer (in particular, the degree of branching which depends on the polymerization initiator used). The terminal group equivalent molecular weight of the polyoxyalkylene polymer (A) can be determined also by creating a calibration curve representing the relationship between the number-average molecular weight of the organic polymer precursor as determined by common GPC analysis and the terminal group equivalent molecular weight, determining the number-average molecular weight of the polyoxyalkylene polymer (A) by GPC analysis, and converting the determined number-average molecular weight to the terminal group equivalent molecular weight based on the calibration curve.

The polyoxyalkylene polymer (A) is not limited to having a particular molecular weight distribution (Mw/Mn), but may have a narrow molecular weight distribution. The dispersity Mw/Mn may be less than 2.0, 1.6 or less, 1.5 or less, or 1.4 or less. The molecular weight distribution of the polyoxyalkylene polymer (A) can be determined from the number-average molecular weight and weight-average molecular weight obtained by GPC analysis.

The main chain structure of the polyoxyalkylene polymer (A) may be linear or branched.

<Method of Synthesizing Polyoxyalkylene Polymer (A)>

Hereinafter, how to synthesize the polyoxyalkylene polymer (A) will be described.

The polyoxyalkylene polymer (A) that has one or less reactive silicon groups on average per terminal moiety can be obtained by introducing one unsaturated carbon-carbon bond per end of a hydroxy-terminated polymer resulting from polymerization and then reacting a reactive silicon group-containing compound with the introduced unsaturated carbon-carbon bonds. To introduce the unsaturated carbon-carbon bonds into the polymer, an unsaturated carbon-carbon bond-containing halogenated hydrocarbon compound described later can be used. The halogenated hydrocarbon compound used can be a later-described carbon-carbon double bond-containing halogenated hydrocarbon compound such as allyl chloride or can be a carbon-carbon triple bond-containing halogenated hydrocarbon compound such as propargyl chloride.

The polyoxyalkylene polymer (A) that has more than one reactive silicon groups per terminal moiety may be obtained by introducing two or more unsaturated carbon-carbon bonds per end of a hydroxy-terminated polymer resulting from polymerization and then reacting a reactive silicon group-containing compound with the introduced unsaturated carbon-carbon bonds. The following describes this preferred synthesis method.

(Polymerization)

The synthesis of the polyoxyalkylene polymer (A) may be carried out using a method in which an epoxy compound is polymerized with a hydroxy group-containing initiator in the presence of a double metal cyanide complex catalyst such as zinc hexacyanocobaltate-glyme complex.

Examples of the hydroxy group-containing initiator include compounds containing one or more hydroxy groups, such as ethylene glycol, propylene glycol, glycerin, pentaerythritol, low-molecular-weight polyoxypropylene glycol, polyoxypropylene triol, allyl alcohol, polypropylene monoallyl ether, and polypropylene monoalkyl ether.

Examples of the epoxy compound include alkylene oxides such as ethylene oxide and propylene oxide and glycidyl ethers such as methyl glycidyl ether and allyl glycidyl ether. Among these, propylene oxide is preferred.

(Introduction of Unsaturated Carbon-Carbon Bonds)

The introduction of two or more unsaturated carbon-carbon bonds into one terminal moiety may be accomplished using a method in which an alkali metal salt is allowed to act on the hydroxy-terminated polymer and thereafter the polymer is reacted first with an unsaturated carbon-carbon bond-containing epoxy compound and then with an unsaturated carbon-carbon bond-containing halogenated hydrocarbon compound. With the use of this method, the molecular weight and molecular weight distribution of the polymer main chain can be controlled depending on the polymerization conditions, and at the same time the reactive groups can be introduced efficiently and reliably.

The alkali metal salt may be sodium hydroxide, sodium methoxide, sodium ethoxide, potassium hydroxide, potassium methoxide, or potassium ethoxide, or sodium methoxide or potassium methoxide. Sodium methoxide is particularly preferred in terms of availability.

The temperature at which the alkali metal salt is allowed to act on the hydroxy-terminated polymer may be from 50 to 150 °C or from 110 to 140 °C. The time for which the alkali metal salt is allowed to act on the hydroxy-terminated polymer may be from 10 minutes to 5 hours or from 30 minutes to 3 hours.

A compound represented by the following formula (3) is particularly suitable for use as the unsaturated carbon-carbon bond-containing epoxy compound ($R^1$ and $R^2$ in the formula are as defined above).

[Chem 3]

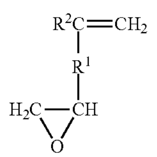

(3)

Specifically, allyl glycidyl ether, methallyl glycidyl ether, glycidyl acrylate, glycidyl methacrylate, butadiene monoxide, and 1,4-cyclopentadiene monoepoxide are preferred in terms of reaction activity, and allyl glycidyl ether is particularly preferred.

The amount of the unsaturated carbon-carbon bond-containing epoxy compound to be added can be freely chosen taking into account the amount of the unsaturated carbon-carbon bonds to be introduced into the polymer and the reactivity of the epoxy compound with the polymer. In particular, the molar ratio of the epoxy compound to the hydroxy groups of the hydroxy-terminated polymer may be 0.2 or more or 0.5 or more. The molar ratio may be 5.0 or less or 2.0 or less.

The reaction temperature at which the hydroxy group-containing polymer is subjected to a ring-opening addition reaction with the unsaturated carbon-carbon bond-containing epoxy compound may be from 60 to 150 °C or from 110 to 140 °C.

Examples of the unsaturated carbon-carbon bond-containing halogenated hydrocarbon compound include vinyl chloride, allyl chloride, methallyl chloride, vinyl bromide, allyl bromide, methallyl bromide, vinyl iodide, allyl iodide, and methallyl iodide. In terms of ease of handling, it is more preferable to use allyl chloride or methallyl chloride.

The amount of the unsaturated carbon-carbon bond-containing halogenated hydrocarbon compound to be added is not limited to a particular range. The molar ratio of the halogenated hydrocarbon compound to the hydroxy groups of the hydroxy-terminated polymer may be 0.7 or more or 1.0 or more. The molar ratio may be 5.0 or less or 2.0 or less.

The temperature at which the unsaturated carbon-carbon bond-containing halogenated hydrocarbon compound is reacted with the polymer may be from 50 to 150 °C or from 110 to 140 °C. The reaction time may be from 10 minutes to 5 hours or from 30 minutes to 3 hours.

(Introduction of Reactive Silicon Groups)

The method of introducing reactive silicon groups is not limited to a particular technique, and known methods can be used. The following are examples of the introduction method.

(i) A method in which a hydrosilane compound is added to an unsaturated carbon-carbon bond-containing polymer by a hydrosilylation reaction.

(ii) A method in which an unsaturated carbon-carbon bond-containing polymer is reacted with a compound having both a reactive silicon group and a group capable of reacting with the unsaturated carbon-carbon bond to form a bond (this compound is also referred to as a "silane coupling agent"). For example, the group capable of reacting with the unsaturated carbon-carbon bond to form a bond is, but not limited to, a mercapto group.

(iii) A method in which a reactive group-containing polymer is reacted with a silane coupling agent. Examples of the combination of the reactive group of the reactive group-containing polymer and the reactive group of the silane coupling agent include, but are not limited to, a combination of a hydroxy group and an isocyanate group, a combination of a hydroxy group and an epoxy group, a combination of an amino group and an isocyanate group, a combination of an amino group and a thioisocyanate group, a combination of an amino group and an epoxy group, a combination of an amino group and an α,β-unsaturated carbonyl group (Michael addition reaction), a combination of a carboxy group and an epoxy group, and a combination of an unsaturated bond and a mercapto group.

The method (i) is preferred in that the reaction is easy to conduct, the amount of the reactive silicon groups to be introduced can be adjusted, and the resulting reactive silicon group-containing polyoxyalkylene polymer (A) has stable physical properties. The methods (ii) and (iii) are preferred in that these methods permit a wide choice of reactions and allow the degree of reactive silicon group introduction to be easily increased.

Examples of the hydrosilane compound that can be used in the method (i) include, but are not limited to, trimethoxysilane, triethoxysilane, tris(2-propenyloxy)silane, triacetoxysilane, dimethoxymethylsilane, diethoxymethylsilane, dimethoxyethylsilane, (chloromethyl)dimethoxysilane, (chloromethyl)diethoxysilane, (methoxymethyl)dimethoxysilane, (methoxymethyl)diethoxysilane, (N,N-diethylaminomethyl)dimethoxysilane, and (N,N-diethylaminomethyl) diethoxysilane.

As for the amount of the hydrosilane compound used, the molar ratio of the compound to the unsaturated carbon-carbon bonds of the precursor polymer (the number of moles of hydrosilane/the number of moles of unsaturated carbon-carbon bonds) may be from 0.05 to 10 in terms of reactivity or from 0.3 to 2 in terms of economy.

The hydrosilylation reaction can be accelerated by using a catalyst. The hydrosilylation catalyst used may be any of known catalysts such as various complexes of cobalt, nickel, iridium, platinum, palladium, rhodium, and ruthenium. Examples of the catalyst that can be used include: platinum supported on a support such as alumina, silica, or carbon black; chloroplatinic acid; a chloroplatinic acid complex composed of chloroplatinic acid and another compound such as an alcohol, an aldehyde, or a ketone; platinum-olefin complexes such as $Pt(CH_2{=}CH_2)_2(PPh_3)$ and $Pt(CH_2{=}CH_2)_2Cl_2$; platinum-vinyl siloxane complexes such as $Pt\{(vinyl)Me_2SiOSiMe_2(vinyl)\}$ and $Pt\{Me(vinyl)SiO\}_4$; platinum-phosphine complexes such as $Pt(PPh_3)_4$ and $Pt(PBu_3)_4$; and platinum-phosphite complexes such as $Pt\{P(OPh)_3\}_4$. The use of a platinum catalyst such as chloroplatinic acid or a platinum-vinyl siloxane complex is preferred in terms of reaction efficiency.

Examples of the silane coupling agent that can be used in the method (ii) or (iii) include: mercaptosilanes reactive with unsaturated bonds, such as 3-mercaptopropyltrimethoxysilane, 3-mercaptopropyldimethoxymethylsilane, 3-mercaptopropyltriethoxysilane, mercaptomethyltriethoxysilane, and mercaptomethyldimethoxymethylsilane; isocyanatosilanes reactive with hydroxy groups, such as 3-isocyanatopropyltrimethoxysilane, 3-isocyanatopropyldimethoxymethylsilane, 3-isocyanatopropyltriethoxysilane, isocyanatomethyltrimethoxysilane, isocyanatomethyltriethoxysilane, and isocyanatomethyldimethoxymethylsilane; epoxysilanes reactive with hydroxy, amino, or carboxy groups, such as 3-glycidoxypropyltrimethoxysilane, 3-glycidoxypropyldimethoxymethylsilane, 3-glycidoxypropyltriethoxysilane, glycidoxymethyltrimethoxysilane, glycidoxymethyltriethoxysilane, and glycidoxymethyldimethoxymethylsilane; aminosilanes reactive with isocyanate or thioisocyanate groups, such as 3-aminopropyltrimethoxysilane, 3-aminopropyldimethoxymethylsilane, 3-aminopropyltriethoxysilane, 3-(2-aminoethyl)propyltrimethoxysilane, 3-(2-aminoethyl)propyldimethoxymethylsilane, 3-(2-aminoethyl) propyltriethoxysilane, 3-(N-ethylamino)-2-methylpropyltrimethoxysilane, 3-ureidopropyltrimethoxysilane, 3-ureidopropyltriethoxysilane, N-phenyl-3-aminopropyltrimethoxysilane, N-benzyl-3-aminopropyltrimethoxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane, N,N'-bis[3-(trimethoxysilyl)propyl]ethylenediamine, and bis(3-(trimethoxysilyl)propyl)amine; and hydroxyalkylsilanes such as 3-hydroxypropyltrimethoxysilane and hydroxymethyltriethoxysilane.

The main chain of the polymer (A) may contain an ester bond or an amide segment represented by the following formula (4) insofar as the effect of one or more embodiments of the present invention is not impaired.

$$—NR^6—C— \quad (4)$$

In this formula, $R^6$ is an organic group having 1 to 10 carbon atoms or a hydrogen atom.

A cured product obtained from a curable composition containing the polymer (A) containing an ester bond or an amide segment can have high hardness and high strength thanks to the action of hydrogen bonds. However, the polymer (A) containing an amide segment could be cleaved due to heat or any other cause. Additionally, the curable composition containing the polymer (A) containing an amide segment tends to have a high viscosity. In view of the above advantages and disadvantages, a polyoxyalkylene containing an amide segment may be used as the polymer (A), or a polyoxyalkylene free of any amide segment may be used as the polymer (A).

Examples of the amide segment represented by the formula (4) include an amide segment formed by a reaction between an isocyanate group and a hydroxy group, an amide segment formed by a reaction between an amino group and a carbonate, an amide segment formed by a reaction between an isocyanate group and an amino group, and an amide segment formed by a reaction between an isocyanate group and a mercapto group. A segment formed by a reaction between an amide segment containing an activated hydrogen atom and an isocyanate group is also categorized as the amide segment represented by the formula (4).

An example of the method of producing the amide segment-containing polymer (A) is a method in which a polyoxyalkylene terminated by an activated hydrogen-containing group is reacted with an excess amount of polyisocyanate compound to synthesize a polymer terminated by an isocyanate group and after or simultaneously with the synthesis, the Z group of a silicon compound represented by the following formula (5) is reacted with all or part of the isocyanate groups of the synthesized polymer.

$$Z—R^7—SiR^5_cX_{3-c} \quad (5)$$

In this formula, $R^5$, X, and c are as defined above, $R^7$ may be a divalent organic group or a divalent hydrocarbon group having 1 to 20 carbon atoms, Z is a hydroxy, carboxy, mercapto, or primary or secondary amino group.

Examples of the silicon compound represented by the formula (5) include, but are not limited to: amino group-containing silanes such as γ-aminopropyldimethoxymethylsilane, γ-aminopropyltrimethoxysilane, N-(β-aminoethyl)-γ-aminopropyltrimethoxysilane, N-(β-aminoethyl)-γ-aminopropyldimethoxymethylsilane, (N-phenyl)-γ-aminopropyltrimethoxysilane, and N-ethylaminoisobutyltrimethoxysilane; hydroxy group-containing silanes such as γ-hydroxypropyltrimethoxysilane; and mercapto group-containing silanes such as γ-mercaptopropyltrimethoxysilane and mercaptomethyltriethoxysilane. Additionally, as described in Japanese Laid-Open Patent Application Publication No. H6-211879 (U.S. Pat. No. 5,364,955), Japanese Laid-Open Patent Application Publication No. H10-53637 (U.S. Pat. No. 5,756,751), Japanese Laid-Open Patent Application Publication No. H10-204144 (EP 0831108), Japanese Laid-Open Patent Application Publication No. 2000-169544, and Japanese Laid-Open Patent Application Publication No. 2000-169545, a product of a Michael addition reaction between any of various α,β-unsaturated carbonyl compounds and any of various primary amino group-containing silanes or a product of a Michael addition reaction between any of various (meth)acryloyl group-containing silanes and any of various primary amino group-containing compounds can also be used as the silicon compound represented by the formula (5).

Another example of the method of producing the amide segment-containing polymer (A) is a method in which a polyoxyalkylene terminated by an activated hydrogen-containing group is reacted with a reactive silicon group-containing isocyanate compound represented by the following formula (6).

$$O{=}C{=}N—R^7—SiR^5_cX_{3-c} \quad (6)$$

In this formula, $R^7$, $R^5$, X, and c are as defined above.

Examples of the reactive silicon group-containing isocyanate compound represented by the formula (6) include, but are not limited to, γ-trimethoxysilylpropyl isocyanate, γ-triethoxysilylpropyl isocyanate, γ-methyldimethoxysilylpropyl isocyanate, γ-methyldiethoxysilylpropyl isocyanate, γ-(methoxymethyl)dimethoxysilylpropyl isocyanate, trimethoxysilylmethyl isocyanate, triethoxymethylsilylmethyl isocyanate, dimethoxymethylsilylmethyl isocyanate, diethoxymethylsilylmethyl isocyanate, and (methoxymethyl)dimethoxysilylmethyl isocyanate.

In the case where the polymer (A) contains amide segments, the number of the amide segments per molecule of the polyoxyalkylene polymer (A) (the average number of the amide segments) may be from 1 to 10, from 1.5 to 5, or from 2 to 3. If the average number of the amide segments is less than 1, this could lead to insufficient curability. If the average number is more than 10, the polymer (A) could have a high viscosity and be difficult to handle. In order to reduce the viscosity of the curable composition and improve the workability of the curable composition, it is preferable for the polymer (A) to be free of any amide segment.

Methods of blending the polyoxyalkylene polymer (A) and the (meth)acrylic ester copolymer (B) are proposed, for example, in Japanese Laid-Open Patent Application Publication No. S59-122541, Japanese Laid-Open Patent Application Publication No. S63-112642, Japanese Laid-Open Patent Application Publication No. H6-172631, and Japanese Laid-Open Patent Application Publication No. H11-116763. An alternative method is to synthesize the (meth)acrylic ester copolymer (B) by copolymerizing the monomer component of the (meth)acrylic ester copolymer (B) in the presence of the polyoxypropylene polymer (A) having a reactive silicon group.

The polyoxyalkylene polymer (A):(meth)acrylic ester copolymer (B) weight ratio may be from 95:5 to 50:50. When the weight ratio is in this range, a cured product having high tensile strength and high bond strength can be obtained. The (A):(B) weight ratio is from 80:20 to 50:50 or from 70:30 to 50:50.

<<Silanol Condensation Catalyst (C)>>

The curable composition according to one or more embodiments of the present invention may contain a silanol condensation catalyst (C) in order to accelerate a condensation reaction of the reactive silicon groups of the polyoxyalkylene polymer (A) and the (meth)acrylic ester polymer (B) and increase the polymer chain length or induce polymer crosslinking.

Examples of the silanol condensation catalyst (C) include an organotin compound, a metal carboxylate, an amine compound, a carboxylic acid, and an alkoxy metal.

Specific examples of the organotin compound include dibutyltin dilaurate, dibutyltin dioctanoate, dibutyltin bis (butyl maleate), dibutyltin diacetate, dibutyltin oxide, dibutyltin bis(acetylacetonate), dioctyltin bis(acetylacetonate), dioctyltin dilaurate, dioctyltin distearate, dioctyltin diacetate, dioctyltin oxide, a reaction product of dibutyltin oxide and a silicate compound, a reaction product of dioctyltin oxide and a silicate compound, and a reaction product of dibutyltin oxide and a phthalic ester.

Specific examples of the metal carboxylate include tin carboxylate, bismuth carboxylate, titanium carboxylate, zirconium carboxylate, and iron carboxylate. The metal carboxylate may be a combination of any of carboxylic acids mentioned below and any of various metals.

Specific examples of the amine compound include: amines such as octylamine, 2-ethylhexylamine, laurylamine, and stearylamine; nitrogen-containing heterocyclic compounds such as pyridine, 1,8-diazabicyclo[5,4,0]undec-7-ene (DBU), and 1,5-diazabicyclo[4,3,0]non-5-ene (DBN); guanidines such as guanidine, phenylguanidine, and diphenylguanidine; biguanides such as butylbiguanide, 1-(o-tolyl) biguanide, and 1-phenylbiguanide; amino group-containing silane coupling agents; and ketimine compounds.

Specific examples of the carboxylic acid include acetic acid, propionic acid, butyric acid, 2-ethylhexanoic acid, lauric acid, stearic acid, oleic acid, linoleic acid, neodecanoic acid, and versatic acid.

Specific examples of the alkoxy metal include: titanium compounds such as tetrabutyl titanate, titanium tetrakis (acetylacetonate), and diisopropoxytitanium bis(ethyl acetoacetate); aluminum compounds such as aluminum tris (acetylacetonate) and diisopropoxyaluminum ethyl acetoacetate; and zirconium compounds such as zirconium tetrakis (acetylacetonate).

In the case of using the silanol condensation catalyst (C), the amount of the silanol condensation catalyst (C) may be from 0.001 to 20 parts by weight, from 0.01 to 15 parts by weight, or from 0.01 to 10 parts by weight per 100 parts by weight of the (meth)acrylic ester polymer (B) or per 100 parts by weight of the total of the polyoxyalkylene polymer (A) and (meth)acrylic ester polymer (B).

<<Additional Components>>

The curable composition according to one or more embodiments of the present invention, which contains the (meth)acrylic ester polymer (B) and optionally the polyoxyalkylene polymer (A) and silanol condensation catalyst (C), may further contain additional components such as a filler, an adhesion promoter, an anti-sagging agent, an antioxidant, a light stabilizer, an ultraviolet absorber, and another resin. Furthermore, the curable composition according to one or more embodiments of the present invention may, if desired, contain various additives to adjust the physical properties of the composition or a cured product of the composition. Examples of the additives include a plasticizer, a solvent, a diluent, a photocurable material, an oxygen-curable material, a surface modifier, a silicate, a curability modifier, a radical inhibitor, a metal deactivator, an antiozonant, a phosphorus-based peroxide decomposer, a lubricant, a pigment, a fungicide, a flame retardant, and a foaming agent.

<Filler>

The curable composition according to one or more embodiments of the present invention can contain a filler. Examples of the filler include ground calcium carbonate, colloidal calcium carbonate, magnesium carbonate, diatomite, clay, talc, titanium oxide, fumed silica, precipitated silica, crystalline silica, molten silica, wet silica, silicic anhydride, hydrated silicic acid, alumina, carbon black, ferric oxide, aluminum fines, zinc oxide, activated zinc oxide, PVC powder, PMMA powder, and glass fibers or filaments.

The amount of the filler used may be from 1 to 300 parts by weight or from 10 to 250 parts by weight per 100 parts by weight of the (meth)acrylic ester polymer (B) or per 100 parts by weight of the total of the polyoxyalkylene polymer (A) and (meth)acrylic ester polymer (B).

An organic or inorganic balloon may be added to reduce the weight (or reduce the specific gravity) of the composition.

<Adhesion Promoter>

The curable composition according to one or more embodiments of the present invention can contain an adhesion promoter. A silane coupling agent or a reaction product of the silane coupling agent can be used as the adhesion promoter.

Specific examples of the silane coupling agent include: amino group-containing silanes such as γ-aminopropyltrimethoxysilane, γ-aminopropylmethyldimethoxysilane, N-β-aminoethyl-γ-aminopropyltrimethoxysilane, N-β-aminoethyl-γ-aminopropylmethyldimethoxysilane, N-phenyl-γ-aminopropyltrimethoxysilane, and (2-aminoethyl)aminomethyltrimethoxysilane; isocyanate group-containing silanes such as γ-isocyanatopropyltrimethoxysilane, γ-isocyanatopropyltriethoxysilane, γ-isocyanatopropylmethyldimethoxysilane, α-isocyanatomethyltrimethoxysilane, and α-isocyanatomethyldimethoxymethylsilane; mercapto group-containing silanes such as γ-mercaptopropyltrimethoxysilane, γ-mercaptopropyltriethoxysilane, and γ-mercaptopropylmethyldimethoxysilane; and epoxy group-containing silanes such as γ-glycidoxypropyltrimethoxysilane and β-(3,4-epoxycyclohexyl)ethyltrimethoxysilane. One of the above adhesion promoters may be used alone, or a mixture of two or more thereof may be used. Reaction products of various silane coupling agents can also be used.

The amount of the silane coupling agent used may be from 0.1 to 20 parts by weight or from 0.5 to 10 parts by weight per 100 parts by weight of the (meth)acrylic ester polymer (B) or per 100 parts by weight of the total of the polyoxyalkylene polymer (A) and (meth)acrylic ester polymer (B).

<Anti-Sagging Agent>

The curable composition according to one or more embodiments of the present invention may, if desired, contain an anti-sagging agent to prevent sagging and improve workability. Examples of the anti-sagging agent include, but are not limited to, polyamide waxes, hydrogenated castor oil derivatives, and metallic soaps such as calcium stearate, aluminum stearate, and barium stearate. One of these anti-sagging agents may be used alone, or two or more thereof may be used in combination.

The amount of the anti-sagging agent used may be from 0.1 to 20 parts by weight per 100 parts by weight of the (meth)acrylic ester polymer (B) or per 100 parts by weight of the total of the polyoxyalkylene polymer (A) and (meth) acrylic ester polymer (B).

<Antioxidant>

The curable composition according to one or more embodiments of the present invention can contain an antioxidant (anti-aging agent). The use of an antioxidant can increase the weathering resistance of the cured product. Examples of the antioxidant include hindered phenol antioxidants, monophenol antioxidants, bisphenol antioxidants, and polyphenol antioxidants. Specific examples of the antioxidant are described in Japanese Laid-Open Patent Application Publication No. H4-283259 and Japanese Laid-Open Patent Application Publication No. H9-194731.

The amount of the antioxidant used may be from 0.1 to 10 parts by weight or from 0.2 to 5 parts by weight per 100 parts by weight of the (meth)acrylic ester polymer (B) or per 100 parts by weight of the total of the polyoxyalkylene polymer (A) and (meth)acrylic ester polymer (B).

<Light Stabilizer>

The curable composition according to one or more embodiments of the present invention can contain a light stabilizer. The use of a light stabilizer can prevent photo-oxidative degradation of the cured product. Examples of the light stabilizer include benzotriazole, hindered amine, and benzoate compounds. Particularly preferred are hindered amine compounds.

The amount of the light stabilizer used may be from 0.1 to 10 parts by weight or from 0.2 to 5 parts by weight per 100 parts by weight of the (meth)acrylic ester polymer (B) or per 100 parts by weight of the total of the polyoxyalkylene polymer (A) and (meth)acrylic ester polymer (B).

<Ultraviolet Absorber>

The curable composition according to one or more embodiments of the present invention can contain an ultraviolet absorber. The use of an ultraviolet absorber can increase the surface weathering resistance of the cured product. Examples of the ultraviolet absorber include benzophenone, benzotriazole, salicylate, substituted tolyl, and metal chelate compounds. Particularly preferred are benzotriazole compounds. Specific examples include ultraviolet absorbers sold under the trade names Tinuvin P, Tinuvin 213, Tinuvin 234, Tinuvin 326, Tinuvin 327, Tinuvin 328, Tinuvin 329, and Tinuvin 571 (all of these are manufactured by BASF).

The amount of the ultraviolet absorber used may be from 0.1 to 10 parts by weight or from 0.2 to 5 parts by weight per 100 parts by weight of the (meth)acrylic ester polymer (B) or per 100 parts by weight of the total of the polyoxyalkylene polymer (A) and (meth)acrylic ester polymer (B).

The curable composition according to one or more embodiments of the present invention may be prepared as a one-part composition all the components of which are blended together and hermetically stored and which, when applied to any object, cures under the action of moisture in the air.

In the case where the curable composition is a one-part composition, all the components are blended together beforehand. Thus, it is preferable that a water-containing component be dried to remove water before use or dehydrated by a manipulation such as pressure reduction during blending or kneading.

A suitable drying/dehydrating method used when the water-containing component is a solid such as powder is drying by heating, and a suitable drying/dehydrating method used when the water-containing component is a liquid is dehydration under reduced pressure or dehydration using synthetic zeolite, activated alumina, silica gel, quicklime, or magnesium oxide. Alternatively, a small amount of isocyanate compound may be added to react the isocyanate group with water and thus accomplish dehydration. An oxazolidine compound such as 3-ethyl-2-methyl-2-(3-methylbutyl)-1,3-oxazolidine may be added to react the oxazolidine compound with water and thus accomplish dehydration.

The storage stability of the curable composition can be further improved by not only performing the drying/dehydration as described above but also adding a lower alcohol such as methanol or ethanol or an alkoxysilane compound. Examples of the alkoxysilane compound include n-propyltrimethoxysilane, vinyltrimethoxysilane, vinylmethyldimethoxysilane, γ-mercaptopropylmethyldimethoxysilane, γ-mercaptopropylmethyldiethoxysilane, and γ-glycidoxypropyltrimethoxysilane.

The amount of the dehydrating agent used, in particular the alkoxysilane compound, may be from 0.1 to 20 parts by weight or from 0.5 to 10 parts by weight per 100 parts by weight of the (meth)acrylic ester polymer (B) or per 100 parts by weight of the total of the polyoxyalkylene polymer (A) and (meth)acrylic ester polymer (B).

The method of preparing the curable composition according to one or more embodiments of the present invention is not limited to a particular technique. For example, a common method can be employed in which the components described above are mixed and the mixture is kneaded using a mixer, a roll mill, or a kneader at normal temperature or under heating or in which the components are dissolved and mixed using a small amount of suitable solvent.

The curable composition according to one or more embodiments of the present invention can be used, for example, as a sealing material for buildings, ships, automobiles, or roads, an adhesive, a mold making material, a vibration-isolating material, a vibration-damping material, a soundproofing material, a foam material, a paint, a spray material, or a waterproofing coating material.

A cured product obtained by curing the curable composition according to one or more embodiments of the present invention has high adhesion to various kinds of adherends. As such, the curable composition is used as a sealing material or an adhesive.

The curable composition according to one or more embodiments of the present invention can be used in diverse applications, including: a material for use in an electrical or electronic part, such as a sealant for the back side of a solar cell; an electrical insulating material such as an insulating sheath material for an electric wire or a cable; an elastic adhesive; a contact adhesive; a spray-type sealing material; a crack-repairing material; an adhesive for tile laying; a powder paint; a cast molding material; a rubber material for medical purposes; a pressure-sensitive adhesive for medical purposes; a medical device sealing material; a food packaging material; a joint sealing material for exterior cladding such as siding board; a coating material; a primer; an electrically conductive material for electromagnetic wave shielding; a thermally conductive material; a hot-melt material; a potting agent for electrical or electronic purposes; a film; a gasket; any kind of molding material; a rust-proofing or waterproofing sealant for an edge face (cut edge) of wire glass or laminated glass; and a liquid sealing material used for industrial parts such as parts of automobiles, electric machines, and various mechanical machines.

A cured product of the curable composition according to one or more embodiments of the present invention can, alone or with the help of a primer, adhere to a wide variety of substrates such as glass, porcelain, wood, metal, and a resin molded article. Thus, the curable composition can be used also as a sealing composition or an adhesive composition.

The curable composition according to one or more embodiments of the present invention can be used also as an adhesive for interior panels, an adhesive for exterior panels, an adhesive for tile laying, an adhesive for stone laying, an adhesive for ceiling finishing, an adhesive for floor finishing, an adhesive for wall finishing, an adhesive for vehicle panels, an adhesive for assembly of electrical, electronic, or precision equipment, a sealing material for direct glazing, a sealing material for double-glazed glass, a sealing material for SSG, or a sealing material for working joints of buildings.

EXAMPLES

Hereinafter, one or more embodiments of the present invention will be described in more detail using examples. The examples given below are not intended to limit one or more embodiments of the present invention.

(Number-Average Molecular Weight and Weight-Average Molecular Weight)

The number-average and weight-average molecular weights mentioned in the examples are GPC molecular weights measured under the following conditions.

Delivery system: HLC-8220 GPC manufactured by Tosoh Corporation

Column: TSK-GEL H type manufactured by Tosoh Corporation

Solvent: THF

Molecular weight: Polystyrene equivalent

Measurement temperature: 40 °C.

(Sulfur Atom Concentration)

Each of the values of the sulfur atom concentration is a theoretical value calculated from the total amount of the monomer component used to produce the (meth)acrylic ester copolymer (B) and the amount of the chain transfer agent (b3) having a mercapto group.

(Synthesis Example 1)

Propylene oxide was polymerized using polyoxypropylene glycol having a number-average molecular weight of about 2,000 as an initiator in the presence of a zinc hexacyanocobaltate-glyme complex catalyst. This polymerization yielded polyoxypropylene terminated at both ends by hydroxy groups and having a number-average molecular weight of 28,500 (terminal group equivalent molecular weight of 17,700) and a dispersity Mw/Mn of 1.21. Sodium methoxide dissolved in methanol at a concentration of 28% was added in an amount of 1.0 molar equivalents per molar equivalent of the hydroxy groups of the hydroxy-terminated polyoxypropylene. After methanol was distilled off by evaporation under vacuum, 1.0 molar equivalents of allyl glycidyl ether was added per molar equivalent of the hydroxy groups of the hydroxy-terminated polyoxypropylene, and the reaction was allowed to proceed at 130 °C for 2 hours. Subsequently, 0.28 molar equivalents of sodium methoxide dissolved in methanol was added, then methanol was removed, and 1.79 molar equivalents of allyl chloride was further added to convert the terminal hydroxy groups to allyl groups. To 100 parts by weight of the unpurified, ally-terminated polyoxypropylene were added 300 parts by weight of n-hexane and 300 parts by weight of water, and the mixture was stirred and then centrifuged to remove water. To the resulting hexane solution was added 300 parts by weight of water, and the mixture was stirred and then centrifuged to remove water. This was followed by evaporation under reduced pressure to remove hexane. Through the above procedures, polyoxypropylene having a terminal structure having two or more unsaturated carbon-carbon bonds was obtained. For this polymer, it was found that 2.0 unsaturated carbon-carbon bonds were introduced on average per terminal moiety.

To 100 parts by weight of the polyoxypropylene having 2.0 unsaturated carbon-carbon bonds on average per terminal moiety was added 36 ppm of a platinum-divinyldisiloxane complex (isopropanol solution with a concentration of 3 wt % calculated as the platinum content), and then 2.2 parts by weight of trimethoxysilane was slowly added dropwise under stirring. The liquid mixture was reacted at 90 °C for 2 hours, after which trimethoxysilane remaining unreacted was distilled off under reduced pressure to give a reactive silicon group-containing linear polyoxypropylene polymer (A-1) having 1.6 trimethoxysilyl groups on average per terminal moiety, 3.2 silicon groups on average per molecule, and a number-average molecular weight of 28,500.

Synthesis Example 2

Propylene oxide was polymerized using polyoxypropylene glycol having a number-average molecular weight of about 2,000 as an initiator in the presence of a zinc hexacyanocobaltate-glyme complex catalyst. This polymerization yielded polyoxypropylene terminated at both ends by hydroxy groups and having a number-average molecular weight of 28,500 (terminal group equivalent molecular weight of 17,700) and a dispersity Mw/Mn of 1.21. Sodium methoxide dissolved in methanol at a concentration of 28% was added in an amount of 1.2 molar equivalents per molar equivalent of the hydroxy groups of the hydroxy-terminated polyoxypropylene. After methanol was distilled off by evaporation under vacuum, 1.5 molar equivalents of 3-chloro-1-propene was added per molar equivalent of the hydroxy groups of the hydroxy-terminated polyoxypropylene, and the reaction was allowed to proceed at 130 °C for 2 hours. To 100 parts by weight of the unpurified, ally-terminated polyoxypropylene were added 300 parts by weight of n-hexane and 300 parts by weight of water, and the mixture was stirred and then centrifuged to remove water. To the resulting hexane solution was added 300 parts by weight of water, and the mixture was stirred and then centrifuged to remove water. This was followed by evaporation under reduced pressure to remove hexane.

To 100 parts by weight of the resulting polyoxypropylene was added 36 ppm of a platinum-divinyldisiloxane complex (isopropanol solution with a concentration of 3 wt % calculated as the platinum content), and then 1.0 parts by weight of dimethoxymethylsilane was slowly added dropwise under stirring. The liquid mixture was reacted at 90 °C for 2 hours, after which dimethoxymethylsilane remaining unreacted was distilled off under reduced pressure to give a reactive silicon group-containing linear polyoxypropylene polymer (A-2) having 1.6 silicon groups on average per molecule and a number-average molecular weight of 28,500.

Synthesis Example 3

A reactor from which oxygen was removed was charged with 0.42 parts by weight of cuprous bromide and 20.0 parts by weight of butyl acrylate, and they were stirred under heating. To the mixture were added 8.8 parts by weight of acetonitrile serving as a polymerization solvent and 9.4 parts by weight of diethyl 2,5-dibromoadipate serving as an initiator. The temperature of the resulting liquid mixture was adjusted to about 80 °C, and at this moment pentamethyldiethylenetriamine (hereinafter abbreviated as “triamine”) was added to initiate a polymerization reaction. Subsequently, 80.0 parts by weight of butyl acrylate was added in batches to allow the polymerization reaction to proceed. During the polymerization, triamine was added at appropriate times to adjust the polymerization rate. The total amount of triamine used for the polymerization was 0.15 parts by weight. After the monomer conversion percentage (polymerization reaction percentage) exceeded about 95%, volatile matter was removed by evaporation under reduced pressure to give a polymer concentrate.

The concentrate was diluted with toluene. To the dilution were added a filtration aid, an adsorbent (KYOWAAD 700SEN, manufactured by Kyowa Chemical Industry Co., Ltd.), and hydrotalcite (KYOWAAD 500SH, manufactured by Kyowa Chemical Industry Co., Ltd.). The mixture was stirred under heating to about 80 to 100 °C and then filtered to remove solids. The filtrate was concentrated under reduced pressure to give a roughly purified polymer.

To the roughly purified polymer were added 11.2 parts by weight of potassium acrylate, 100 ppm of 4-hydroxy-TEMPO, and 100 parts by weight of dimethylacetamide serving as a solvent, and the reaction was allowed to proceed at 70 °C for 3 hours. After that, the solvent was distilled off under reduced pressure to give a polymer concentrate. The concentrate was diluted with toluene, and the dilution was filtered to remove solids. The filtrate was concentrated under reduced pressure to give a polyfunctional macromonomer (b2-1) terminated at both ends by acryloyl groups (i.e., having two acryloyl groups in the polymer molecule) and having a number-average molecular weight of 4,030 (GPC molecular weight) and a dispersity (Mw/Mn) of 1.23.

Synthesis Example 4

A reactor from which oxygen was removed was charged with 0.42 parts by weight of cuprous bromide and 20.0 parts by weight of butyl acrylate, and they were stirred under heating. To the mixture were added 8.8 parts by weight of acetonitrile serving as a polymerization solvent and 4.7 parts by weight of diethyl 2,5-dibromoadipate serving as an initiator. The temperature of the resulting liquid mixture was adjusted to about 80 °C, and at this moment pentamethyldiethylenetriamine (hereinafter abbreviated as "triamine") was added to initiate a polymerization reaction. Subsequently, 80.0 parts by weight of butyl acrylate was added in batches to allow the polymerization reaction to proceed. During the polymerization, triamine was added at appropriate times to adjust the polymerization rate. The total amount of triamine used for the polymerization was 0.15 parts by weight. After the monomer conversion percentage (polymerization reaction percentage) exceeded about 95%, volatile matter was removed by evaporation under reduced pressure to give a polymer concentrate.

The concentrate was diluted with toluene. To the dilution were added a filtration aid, an adsorbent (KYOWAAD 700SEN, manufactured by Kyowa Chemical Industry Co., Ltd.), and hydrotalcite (KYOWAAD 500SH, manufactured by Kyowa Chemical Industry Co., Ltd.). The mixture was stirred under heating to about 80 to 100 °C and then filtered to remove solids. The filtrate was concentrated under reduced pressure to give a roughly purified polymer.

To the roughly purified polymer were added 5.4 parts by weight of potassium acrylate, 100 ppm of 4-hydroxy-TEMPO, and 100 parts by weight of dimethylacetamide serving as a solvent, and the reaction was allowed to proceed at 70 °C for 3 hours. After that, the solvent was distilled off under reduced pressure to give a polymer concentrate. The concentrate was diluted with toluene, and the dilution was filtered to remove solids. The filtrate was concentrated under reduced pressure to give a polyfunctional macromonomer (b2-2) terminated at both ends by acryloyl groups (i.e., having two acryloyl groups in the polymer molecule) and having a number-average molecular weight of 8,590 (GPC molecular weight) and a dispersity (Mw/Mn) of 1.15.

Synthesis Example 5

A reactor from which oxygen was removed was charged with 0.42 parts by weight of cuprous bromide and 20.0 parts by weight of butyl acrylate, and they were stirred under heating. To the mixture were added 8.8 parts by weight of acetonitrile serving as a polymerization solvent and 3.1 parts by weight of diethyl 2,5-dibromoadipate serving as an initiator. The temperature of the resulting liquid mixture was adjusted to about 80 °C, and at this moment pentamethyldiethylenetriamine (hereinafter abbreviated as "triamine") was added to initiate a polymerization reaction. Subsequently, 80.0 parts by weight of butyl acrylate was added in batches to allow the polymerization reaction to proceed. During the polymerization, triamine was added at appropriate times to adjust the polymerization rate. The total amount of triamine used for the polymerization was 0.15 parts by weight. After the monomer conversion percentage (polymerization reaction percentage) exceeded about 95%, volatile matter was removed by evaporation under reduced pressure to give a polymer concentrate.

The concentrate was diluted with toluene. To the dilution were added a filtration aid, an adsorbent (KYOWAAD 700SEN, manufactured by Kyowa Chemical Industry Co., Ltd.), and hydrotalcite (KYOWAAD 500SH, manufactured by Kyowa Chemical Industry Co., Ltd.). The mixture was stirred under heating to about 80 to 100 °C and then filtered to remove solids. The filtrate was concentrated under reduced pressure to give a roughly purified polymer.

To the roughly purified polymer were added 3.8 parts by weight of potassium acrylate, 100 ppm of 4-hydroxy-TEMPO, and 100 parts by weight of dimethylacetamide serving as a solvent, and the reaction was allowed to proceed at 70 °C for 3 hours. After that, the solvent was distilled off under reduced pressure to give a polymer concentrate. The concentrate was diluted with toluene, and the dilution was filtered to remove solids. The filtrate was concentrated under reduced pressure to give a polyfunctional macromonomer (b2-3) terminated at both ends by acryloyl groups (i.e., having two acryloyl groups in the polymer molecule) and having a number-average molecular weight of 11,410 (GPC molecular weight) and a dispersity (Mw/Mn) of 1.27.

Synthesis Example 6

A four-necked flask equipped with a stirrer was charged with 48.0 parts by weight of isobutanol, which was heated to 105 °C under nitrogen atmosphere. To the heated isobutanol was added dropwise over 5 hours a liquid mixture prepared by dissolving 59.0 parts by weight of butyl acrylate, 10.0 parts by weight of stearyl methacrylate, 30.0 parts by weight of the polyfunctional macromonomer (b2-1) prepared in Synthesis Example 3, 1.0 parts by weight of 3-methacryloxypropyltrimethoxysilane, 7.2 parts by weight of 3-mercaptopropyltrimethoxysilane, and 2.5 parts by weight of 2,2'-azobis(2-methylbutyronitrile) in 22.7 parts by weight of isobutanol. Polymerization was allowed to proceed at 105 °C for 2 hours to give an isobutanol solution (solid content=60%) of a reactive silicon group-containing (meth)acrylic ester copolymer (B-1) having a number-average molecular weight of 2,280 (GPC molecular weight). In the solids contained in the solution, the amount of the polyfunctional macromonomer was 0.069 mmol/g, the amount of the reactive silicon groups was 0.38 mmol/g, and the sulfur atom content was 10941 ppm.

Synthesis Example 7

A four-necked flask equipped with a stirrer was charged with 48.0 parts by weight of isobutanol, which was heated to 105 °C under nitrogen atmosphere. To the heated isobutanol was added dropwise over 5 hours a liquid mixture prepared by dissolving 59.0 parts by weight of butyl acrylate, 10.0 parts by weight of stearyl methacrylate, 85.0 parts by weight of the polyfunctional macromonomer (b2-1) prepared in Synthesis Example 3, 1.0 parts by weight of 3-methacryloxypropyltrimethoxysilane, 7.2 parts by weight of 3-mercaptopropyltrimethoxysilane, and 2.5 parts by weight of 2,2'-azobis(2-methylbutyronitrile) in 22.7 parts by weight of isobutanol. Polymerization was allowed to proceed at 105 °C for 2 hours to give an isobutanol solution (solid content=60%) of a reactive silicon group-containing (meth)acrylic ester copolymer (B-2) having a number-average molecular weight of 3,720 (GPC molecular weight). In the solids contained in the solution, the amount of the polyfunctional macromonomer was 0.13 mmol/g, the amount of the reactive silicon groups was 0.25 mmol/g, and the sulfur atom content was 7185 ppm.

Synthesis Example 8

A four-necked flask equipped with a stirrer was charged with 48.0 parts by weight of isobutanol, which was heated to 105 °C under nitrogen atmosphere. To the heated isobutanol was added dropwise over 5 hours a liquid mixture prepared by dissolving 59.0 parts by weight of butyl acrylate, 10.0 parts by weight of stearyl methacrylate, 85.0 parts by weight of the polyfunctional macromonomer (b2-1) prepared in Synthesis Example 3, 1.0 parts by weight of 3-methacryloxypropyltrimethoxysilane, 13.0 parts by weight of 3-mercaptopropyltrimethoxysilane, and 2.5 parts by weight of 2,2'-azobis(2-methylbutyronitrile) in 22.7 parts by weight of isobutanol. Polymerization was allowed to proceed at 105 °C for 2 hours to give an isobutanol solution (solid content=60%) of a reactive silicon group-containing (meth)acrylic ester copolymer (B-3) having a number-average molecular weight of 2,350 (GPC molecular weight). In the solids contained in the solution, the amount of the polyfunctional macromonomer was 0.13 mmol/g, the amount of the reactive silicon groups was 0.42 mmol/g, and the sulfur atom content was 12574 ppm.

Synthesis Example 9

A four-necked flask equipped with a stirrer was charged with 53.2 parts by weight of isobutanol, which was heated to 105 °C under nitrogen atmosphere. To the heated isobutanol was added dropwise over 5 hours a liquid mixture prepared by dissolving 40.8 parts by weight of methyl methacrylate, 16.6 parts by weight of butyl acrylate, 0.3 parts by weight of 2-ethylhexyl acrylate, 0.3 parts by weight of stearyl methacrylate, 39.6 parts by weight of the polyfunctional macromonomer (b2-3) prepared in Synthesis Example 5, 0.3 parts by weight of 3-methacryloxypropyltrimethoxysilane, 2.1 parts by weight of 3-mercaptopropyltrimethoxysilane, and 0.29 parts by weight of 2,2'-azobis(2-methylbutyronitrile) in 9.4 parts by weight of isobutanol. A solution of 0.09 parts by weight of 2,2'-azobis(2-methylbutyronitrile) in 2.9 parts by weight of isobutanol was added, and polymerization was allowed to proceed at 105 °C for 2 hours to give an isobutanol solution (solid content=60%) of a reactive silicon group-containing (meth)acrylic ester copolymer (B-4) having a number-average molecular weight of 5,830 (GPC molecular weight). In the solids contained in the solution, the amount of the polyfunctional macromonomer was 0.035 mmol/g, the amount of the reactive silicon groups was 0.12 mmol/g, and the sulfur atom content was 3429 ppm.

Synthesis Example 10

A four-necked flask equipped with a stirrer was charged with 53.2 parts by weight of isobutanol, which was heated to 105 °C under nitrogen atmosphere. To the heated isobutanol was added dropwise over 5 hours a liquid mixture prepared by dissolving 51.5 parts by weight of methyl methacrylate, 21.0 parts by weight of butyl acrylate, 0.4 parts by weight of 2-ethylhexyl acrylate, 0.4 parts by weight of stearyl methacrylate, 25.0 parts by weight of the polyfunctional macromonomer (b2-3) prepared in Synthesis Example 5, 0.4 parts by weight of 3-methacryloxypropyltrimethoxysilane, 1.3 parts by weight of 3-mercaptopropyltrimethoxysilane, and 0.37 parts by weight of 2,2'-azobis(2-methylbutyronitrile) in 11.9 parts by weight of isobutanol. A solution of 0.11 parts by weight of 2,2'-azobis(2-methylbutyronitrile) in 3.6 parts by weight of isobutanol was added, and polymerization was allowed to proceed at 105 °C for 2 hours to give an isobutanol solution (solid content=60%) of a reactive silicon group-containing (meth)acrylic ester copolymer (B-5) having a number-average molecular weight of 9,700 (GPC molecular weight). In the solids contained in the solution, the amount of the polyfunctional macromonomer was 0.022 mmol/g, the amount of the reactive silicon groups was 0.082 mmol/g, and the sulfur atom content was 2123 ppm.

Synthesis Example 11

A four-necked flask equipped with a stirrer was charged with 48.0 parts by weight of isobutanol, which was heated to 105 °C under nitrogen atmosphere. To the heated isobutanol was added dropwise over 5 hours a liquid mixture prepared by dissolving 50.0 parts by weight of methyl methacrylate, 7.0 parts by weight of butyl acrylate, 12.0 parts by weight of stearyl methacrylate, 30 parts by weight of the polyfunctional macromonomer (b2-1) prepared in Synthesis Example 3, 1.0 parts by weight of 3-methacryloxypropyltrimethoxysilane, 7.2 parts by weight of 3-mercaptopropyltrimethoxysilane, and 2.5 parts by weight of 2,2'-azobis(2-methylbutyronitrile) in 22.7 parts by weight of isobutanol. Polymerization was allowed to proceed at 105 °C for 2 hours to give an isobutanol solution (solid content=60%) of a reactive silicon group-containing (meth) acrylic ester copolymer (B-6) having a number-average molecular weight of 2,450 (GPC molecular weight). In the solids contained in the solution, the amount of the polyfunctional macromonomer was 0.069 mmol/g, the amount of the reactive silicon groups was 0.38 mmol/g, and the sulfur atom content was 10941 ppm.

Synthesis Example 12

A four-necked flask equipped with a stirrer was charged with 48.0 parts by weight of isobutanol, which was heated to 105 °C under nitrogen atmosphere. To the heated isobutanol was added dropwise over 5 hours a liquid mixture prepared by dissolving 50.0 parts by weight of methyl methacrylate, 7.0 parts by weight of butyl acrylate, 12.0 parts by weight of stearyl methacrylate, 30 parts by weight of the polyfunctional macromonomer (b2-2) prepared in Synthesis Example 4, 1.0 parts by weight of 3-methacryloxypropyltrimethoxysilane, 7.2 parts by weight of 3-mercaptopropyltrimethoxysilane, and 2.5 parts by weight of 2,2'-azobis(2-methylbutyronitrile) in 22.7 parts by weight of isobutanol. Polymerization was allowed to proceed at 105 °C for 2 hours to give an isobutanol solution (solid content=60%) of a reactive silicon group-containing (meth) acrylic ester copolymer (B-7) having a number-average molecular weight of 2,280 (GPC molecular weight). In the solids contained in the solution, the amount of the polyfunctional macromonomer was 0.033 mmol/g, the amount of the reactive silicon groups was 0.38 mmol/g, and the sulfur atom content was 10941 ppm.

Synthesis Example 13

A four-necked flask equipped with a stirrer was charged with 48.0 parts by weight of isobutanol, which was heated to 105 °C under nitrogen atmosphere. To the heated isobutanol was added dropwise over 5 hours a liquid mixture prepared by dissolving 50.0 parts by weight of methyl methacrylate, 10.0 parts by weight of stearyl methacrylate, 30 parts by weight of the polyfunctional macromonomer (b2-1) prepared in Synthesis Example 3, 10.0 parts by weight of 3-methacryloxypropyltrimethoxysilane, 7.2 parts by weight of 3-mercaptopropyltrimethoxysilane, and 2.5 parts by weight of 2,2'-azobis(2-methylbutyronitrile) in 22.7 parts by weight of isobutanol. Polymerization was allowed to proceed at 105 °C for 2 hours to give an isobutanol solution (solid content=60%) of a reactive silicon group-containing (meth)acrylic ester copolymer (B-8) having a number-average molecular weight of 2,500 (GPC molecular weight). In the solids contained in the solution, the amount of the polyfunctional macromonomer was 0.069 mmol/g, the amount of the reactive silicon groups was 0.72 mmol/g, and the sulfur atom content was 10941 ppm.

Synthesis Example 14

A four-necked flask equipped with a stirrer was charged with 53.2 parts by weight of isobutanol, which was heated to 105 °C under nitrogen atmosphere. To the heated isobutanol was added dropwise over 5 hours a liquid mixture prepared by dissolving 51.5 parts by weight of methyl methacrylate, 21.4 parts by weight of butyl acrylate, 0.4 parts by weight of 2-ethylhexyl acrylate, 0.4 parts by weight of stearyl methacrylate, 25.0 parts by weight of the polyfunctional macromonomer (b2-3) prepared in Synthesis Example 5, 1.3 parts by weight of 3-mercaptopropyltrimethoxysilane, and 0.37 parts by weight of 2,2'-azobis(2-methylbutyronitrile) in 11.9 parts by weight of isobutanol. A solution of 0.11 parts by weight of 2,2'-azobis(2-methylbutyronitrile) in 3.6 parts by weight of isobutanol was added, and polymerization was allowed to proceed at 105 °C for 2 hours to give an isobutanol solution (solid content=60%) of a reactive silicon group-containing (meth)acrylic ester copolymer (B-9) having a number-average molecular weight of 9,460 (GPC molecular weight). In the solids contained in the solution, the amount of the polyfunctional macromonomer was 0.022 mmol/g, the amount of the reactive silicon groups was 0.066 mmol/g, and the sulfur atom content was 2119 ppm.

Synthesis Example 15

A four-necked flask equipped with a stirrer was charged with 53.2 parts by weight of isobutanol, which was heated to 105 °C under nitrogen atmosphere. To the heated isobutanol was added dropwise over 5 hours a liquid mixture prepared by dissolving 51.5 parts by weight of methyl methacrylate, 18.8 parts by weight of butyl acrylate, 0.4 parts by weight of 2-ethylhexyl acrylate, 0.4 parts by weight of stearyl methacrylate, 25.0 parts by weight of the polyfunctional macromonomer (b2-3) prepared in Synthesis Example 5, 2.6 parts by weight of 3-methacryloxypropyltrimethoxysilane, 1.4 parts by weight of n-dodecyl mercaptan, and 0.37 parts by weight of 2,2'-azobis(2-methylbutyronitrile) in 11.9 parts by weight of isobutanol. A solution of 0.11 parts by weight of 2,2'-azobis(2-methylbutyronitrile) in 3.6 parts by weight of isobutanol was added, and polymerization was allowed to proceed at 105 °C for 2 hours to give an isobutanol solution (solid content=60%) of a reactive silicon group-containing (meth)acrylic ester copolymer (B-10) having a number-average molecular weight of 9,320 (GPC molecular weight). In the solids contained in the solution, the amount of the polyfunctional macromonomer was 0.022 mmol/g, the amount of the reactive silicon groups was 0.10 mmol/g, and the sulfur atom content was 2282 ppm.

Synthesis Example 16

A four-necked flask equipped with a stirrer was charged with 47.2 parts by weight of isobutanol, which was heated to 105 °C under nitrogen atmosphere. To the heated isobutanol was added dropwise over 5 hours a liquid mixture prepared by dissolving 33.9 parts by weight of methyl methacrylate, 0.3 parts by weight of butyl acrylate, 14.3 parts by weight of stearyl methacrylate, 38.5 parts by weight of the polyfunctional macromonomer (b2-2) prepared in Synthesis Example 4, 6.4 parts by weight of 3-methacryloxypropyldimethoxymethylsilane, 6.4 parts by weight of 3-mercaptopropyldimethoxymethylsilane, and 0.3 parts by weight of 2,2'-azobis(2-methylbutyronitrile) in 11.3 parts by weight of isobutanol. A solution of 0.2 parts by weight of 2,2'-azobis(2-methylbutyronitrile) in 6.8 parts by weight of isobutanol was added, and polymerization was allowed to proceed at 105 °C for 2 hours to give an isobutanol solution (solid content=60%) of a reactive silicon group-containing (meth)acrylic ester copolymer (B-11) having a number-average molecular weight of 2,650 (GPC molecular weight). In the solids contained in the solution, the amount of the polyfunctional macromonomer was 0.045 mmol/g, the amount of the reactive silicon groups was 0.63 mmol/g, and the sulfur atom content was 11424 ppm.

Synthesis Example 17

A four-necked flask equipped with a stirrer was charged with 48.0 parts by weight of isobutanol, which was heated to 105 °C under nitrogen atmosphere. To the heated isobutanol was added dropwise over 5 hours a liquid mixture prepared by dissolving 50.0 parts by weight of butyl acrylate, 10.0 parts by weight of stearyl methacrylate, 30 parts by weight of the polyfunctional macromonomer (b2-1) prepared in Synthesis Example 3, 10.0 parts by weight of 3-methacryloxypropyltrimethoxysilane, and 2.5 parts by weight of 2,2'-azobis(2-methylbutyronitrile) in 22.7 parts by weight of isobutanol. Polymerization was allowed to proceed at 105 °C for 2 hours to give an isobutanol solution (solid content=60%) of a reactive silicon group-containing (meth)acrylic ester copolymer (P-1) having a number-average molecular weight of 6,950 (GPC molecular weight). In the solids contained in the solution, the amount of the polyfunctional macromonomer was 0.074 mmol/g and the amount of the reactive silicon groups was 0.40 mmol/g.

Synthesis Example 18

A four-necked flask equipped with a stirrer was charged with 48.0 parts by weight of isobutanol, which was heated to 105 °C under nitrogen atmosphere. To the heated isobutanol was added dropwise over 5 hours a liquid mixture prepared by dissolving 89.0 parts by weight of butyl acrylate, 10.0 parts by weight of stearyl methacrylate, 1.0 parts by weight of 3-methacryloxypropyltrimethoxysilane, 1.8 parts by weight of 3-mercaptopropyltrimethoxysilane, and 2.5 parts by weight of 2,2'-azobis(2-methylbutyronitrile) in 22.7 parts by weight of isobutanol. Polymerization was allowed to proceed at 105 °C for 2 hours to give an isobutanol solution (solid content=60%) of a reactive silicon group-containing (meth)acrylic ester copolymer (P-2) having a number-average molecular weight of 3,730 (GPC molecular weight). In the solids contained in the solution, the amount of the reactive silicon groups was 0.13 mmol/g.

Synthesis Example 19

A four-necked flask equipped with a stirrer was charged with 48.0 parts by weight of isobutanol, which was heated to 105 °C under nitrogen atmosphere. To the heated isobutanol was added dropwise over 5 hours a liquid mixture prepared by dissolving 50.0 parts by weight of butyl acrylate, 10.0 parts by weight of stearyl methacrylate, 30 parts by weight of a polyoxyalkylene polymer (p-1) having a number-average molecular weight of 4,800 (GPC molecular weight) and terminated at both ends by allyl groups, 10.0 parts by weight of 3-methacryloxypropyltrimethoxysilane, 7.2 parts by weight of 3-mercaptopropyltrimethoxysilane, and 2.5 parts by weight of 2,2'-azobis(2-methylbutyronitrile) in 22.7 parts by weight of isobutanol. Polymerization was allowed to proceed at 105 °C for 2 hours to give an isobutanol solution (solid content=60%) of a reactive silicon group-containing (meth)acrylic ester copolymer (P-3) having a number-average molecular weight of 1,980 (GPC molecular weight). In the solids contained in the solution, the amount of the reactive silicon groups was 0.72 mmol/g.

Synthesis Example 20

A four-necked flask equipped with a stirrer was charged with 44.5 parts by weight of isobutanol, which was heated to 105 °C under nitrogen atmosphere. To the heated isobutanol was added dropwise over 5 hours a liquid mixture prepared by dissolving 40.8 parts by weight of methyl methacrylate, 54.2 parts by weight of butyl acrylate, 0.5 parts by weight of 2-ethylhexyl acrylate, 0.5 parts by weight of stearyl methacrylate, 0.5 parts by weight of 3-methacryloxypropyltrimethoxysilane, 1.3 parts by weight of 3-mercaptopropyltrimethoxysilane, and 0.37 parts by weight of 2,2'-azobis(2-methylbutyronitrile) in 11.9 parts by weight of isobutanol. A solution of 0.11 parts by weight of 2,2'-azobis (2-methylbutyronitrile) in 3.6 parts by weight of isobutanol was added, and polymerization was allowed to proceed at 105 °C for 2 hours to give an isobutanol solution (solid content=60%) of a reactive silicon group-containing (meth) acrylic ester copolymer (P-4) having a number-average molecular weight of 9,700 (GPC molecular weight). In the solids contained in the solution, the amount of the reactive silicon groups was 0.20 mmol/g, and the sulfur atom content was 5716 ppm.

Synthesis Example 21

A four-necked flask equipped with a stirrer was charged with 48.0 parts by weight of isobutanol, which was heated to 105 °C under nitrogen atmosphere. To the heated isobutanol was added dropwise over 5 hours a liquid mixture prepared by dissolving 50.0 parts by weight of methyl methacrylate, 37.0 parts by weight of butyl acrylate, 12.0 parts by weight of stearyl methacrylate, 1.0 parts by weight of 3-methacryloxypropyltrimethoxysilane, 7.2 parts by weight of 3-mercaptopropyltrimethoxysilane, and 2.5 parts by weight of 2,2'-azobis(2-methylbutyronitrile) in 22.7 parts by weight of isobutanol. Polymerization was allowed to proceed at 105 °C for 2 hours to give an isobutanol solution (solid content=60%) of a reactive silicon group-containing (meth)acrylic ester copolymer (P-5) having a number-average molecular weight of 2,190 (GPC molecular weight). In the solids contained in the solution, the amount of the reactive silicon groups was 0.38 mmol/g.

Synthesis Example 22

A four-necked flask equipped with a stirrer was charged with 48.0 parts by weight of isobutanol, which was heated to 105 °C under nitrogen atmosphere. To the heated isobutanol was added dropwise over 5 hours a liquid mixture prepared by dissolving 50.0 parts by weight of methyl methacrylate, 30.0 parts by weight of butyl acrylate, 10.0 parts by weight of stearyl methacrylate, 10.0 parts by weight of 3-methacryloxypropyltrimethoxysilane, 7.2 parts by weight of 3-mercaptopropyltrimethoxysilane, and 2.5 parts by weight of 2,2'-azobis(2-methylbutyronitrile) in 22.7 parts by weight of isobutanol. Polymerization was allowed to proceed at 105 °C for 2 hours to give an isobutanol solution (solid content=60%) of a reactive silicon group-containing (meth)acrylic ester copolymer (P-6) having a number-average molecular weight of 2,230 (GPC molecular weight). In the solids contained in the solution, the amount of the reactive silicon groups was 0.72 mmol/g.

Synthesis Example 23

A four-necked flask equipped with a stirrer was charged with 48.0 parts by weight of isobutanol, which was heated to 105 °C under nitrogen atmosphere. To the heated isobutanol was added dropwise over 5 hours a liquid mixture prepared by dissolving 50.0 parts by weight of methyl methacrylate, 30.0 parts by weight of butyl acrylate, 10.0 parts by weight of stearyl methacrylate, 10.0 parts by weight of 3-methacryloxypropyltrimethoxysilane, 1.8 parts by weight of 3-mercaptopropyltrimethoxysilane, and 2.5 parts by weight of 2,2'-azobis(2-methylbutyronitrile) in 22.7 parts by weight of isobutanol. Polymerization was allowed to proceed at 105 °C for 2 hours to give an isobutanol solution (solid content=60%) of a reactive silicon group-containing (meth)acrylic ester copolymer (P-7) having a number-average molecular weight of 4,100 (GPC molecular weight). In the solids contained in the solution, the amount of the reactive silicon groups was 0.49 mmol/g.

Synthesis Example 24

A reactor from which oxygen was removed was charged with 0.42 parts by weight of cuprous bromide and 20.0 parts by weight of butyl acrylate, and they were stirred under heating. To the mixture were added 8.8 parts by weight of acetonitrile serving as a polymerization solvent and 5.07 parts by weight of ethyl 2-bromoadipate serving as an initiator. The temperature of the resulting liquid mixture was adjusted to about 80 °C, and at this moment pentamethyldiethylenetriamine (hereinafter abbreviated as "triamine") was added to initiate a polymerization reaction. Subsequently, 80.0 parts by weight of butyl acrylate was added in batches to allow the polymerization reaction to proceed. During the polymerization, triamine was added at appropriate times to adjust the polymerization rate. The total amount of triamine used for the polymerization was 0.15 parts by weight. After the monomer conversion percentage (polymerization reaction percentage) exceeded about 95%, volatile matter was removed by evaporation under reduced pressure to give a polymer concentrate.

The concentrate was diluted with toluene. To the dilution were added a filtration aid, an adsorbent (KYOWAAD 700SEN, manufactured by Kyowa Chemical Industry Co., Ltd.), and hydrotalcite (KYOWAAD 500SH, manufactured by Kyowa Chemical Industry Co., Ltd.). The mixture was stirred under heating to about 80 to 100 °C and then filtered to remove solids. The filtrate was concentrated under reduced pressure to give a roughly purified polymer.

To the roughly purified polymer were added 4.91 parts by weight of potassium acrylate, 100 ppm of 4-hydroxy-TEMPO, and 100 parts by weight of dimethylacetamide serving as a solvent, and the reaction was allowed to proceed at 70 °C for 3 hours. After that, the solvent was distilled off under reduced pressure to give a polymer concentrate. The concentrate was diluted with toluene, and the dilution was filtered to remove solids. The filtrate was concentrated under reduced pressure to give a macromonomer (p-2) terminated at one end by an acryloyl group (i.e., having one acryloyl group in the polymer molecule) and having a number-average molecular weight of 4,040 (GPC molecular weight) and a dispersity (Mw/Mn) of 1.18.

Synthesis Example 25

A four-necked flask equipped with a stirrer was charged with 48.0 parts by weight of isobutanol, which was heated to 105 °C under nitrogen atmosphere. To the heated isobutanol was added dropwise over 5 hours a liquid mixture prepared by dissolving 50.0 parts by weight of butyl acrylate, 10.0 parts by weight of stearyl methacrylate, 30 parts by weight of the macromonomer (p-2) prepared in Synthesis Example 24 and having one acryloyl group in the molecule, 10.0 parts by weight of 3-methacryloxypropyltrimethoxysilane, and 2.5 parts by weight of 2,2'-azobis(2-methylbutyronitrile) in 22.7 parts by weight of isobutanol. Polymerization was allowed to proceed at 105 °C for 2 hours to give an isobutanol solution (solid content=60%) of a reactive silicon group-containing (meth)acrylic ester copolymer (P-8) having a number-average molecular weight of 1,900 (GPC molecular weight). In the solids contained in the solution, the amount of the macromonomer was 0.069 mmol/g and the amount of the reactive silicon groups was 0.72 mmol/g.

Synthesis Example 26

A four-necked flask equipped with a stirrer was charged with 47.2 parts by weight of isobutanol, which was heated to 105 °C under nitrogen atmosphere. To the heated isobutanol was added dropwise over 5 hours a liquid mixture prepared by dissolving 33.9 parts by weight of methyl methacrylate, 38.8 parts by weight of butyl acrylate, 14.3 parts by weight of stearyl methacrylate, 6.4 parts by weight of 3-methacryloxypropyldimethoxymethylsilane, 6.4 parts by weight of 3-mercaptopropyldimethoxymethylsilane, and 0.3 parts by weight of 2,2'-azobis(2-methylbutyronitrile) in 11.3 parts by weight of isobutanol. A solution of 0.2 parts by weight of 2,2'-azobis(2-methylbutyronitrile) in 6.8 parts by weight of isobutanol was added, and polymerization was allowed to proceed at 105 °C for 2 hours to give an isobutanol solution (solid content=60%) of a reactive silicon group-containing (meth)acrylic ester copolymer (P-9) having a number-average molecular weight of 2,300 (GPC molecular weight). In the solids contained in the solution, the amount of the reactive silicon groups was 0.63 mmol/g.

First, isobutanol was evaporated by heating from those isobutanol solutions of the (meth)acrylic ester copolymers (B-1) to (B-3) which were obtained in Synthesis Examples 6 to 8 and those isobutanol solutions of the (meth)acrylic ester copolymers (P-1) to (P-3) which were obtained in Synthesis Examples 17 to 19, and the viscosity of each of the resulting polymers was measured by the method described below.

(Viscosity)

A cone plate (2°) with a diameter of 25 mm was used as a jig, and the gap was set to 60 μm. The viscosity of each polymer was measured at a rotational speed of 0.1 $sec^{-1}$. The device used was a rheometer manufactured by TA instruments (ARES-G2). The results obtained are shown in Table 1.

TABLE 1

| Monomer proportions | | (Meth)acrylic ester copolymer (B) or (P) | | | | | |
|---|---|---|---|---|---|---|---|
| | | B-1 | B-2 | B-3 | P-1 | P-2 | P-3 |
| Monomer component | Monomer (b1): MMA(1) | | | | | | |
| | Monomer (b1): BA(2) | 59.0 (84.2 mol %) | 59.0 (82.0 mol %) | 59.0 (77.4 mol %) | 50.0 (82.0 mol %) | 89.0 (93.6 mol %) | 50.0 (75.7 mol %) |
| | Monomer (b1): SMA(3) | 10.0 (6.0 mol %) | 10.0 (5.8 mol %) | 10.0 (5.5 mol %) | 10.0 (6.9 mol %) | 10.0 (4.4 mol %) | 10.0 (6.4 mol %) |
| | Monomer (b4): TSMA(4) | 1.0 (0.8 mol %) | 1.0 (0.8 mol %) | 1.0 (0.8 mol %) | 10.0 (9.4 mol %) | 1.0 (0.6 mol %) | 10.0 (8.7 mol %) |
| | Chain transfer agent (b3): T-MSi(5) | 7.2 (7.4 mol %) | 7.2 (7.2 mol %) | 13.0 (12.4 mol %) | | 1.8 (1.4 mol %) | 7.2 (7.9 mol %) |
| | Polyfunctional macromonomer (b2-1) | 30.0 (1.5 mol %) | 85.0 (4.2 mol %) | 85.0 (3.9 mol %) | 30.0 (1.7 mol %) | | |
| | Allyl group-containing polyoxyalkylene polymer (P-1) | | | | | | 30.0 (1.3 mol %) |
| b2/b3 (molar ratio) | | 0.20 | 0.58 | 0.32 | — | — | — |
| Sulfur atom concentration (ppm) | | 10941 | 7185 | 12574 | — | 2939 | 10941 |
| Mn | | 2280 | 3720 | 2350 | 6950 | 3730 | 1980 |

TABLE 1-continued

| Monomer proportions | (Meth)acrylic ester copolymer (B) or (P) B-1 | B-2 | B-3 | P-1 | P-2 | P-3 |
|---|---|---|---|---|---|---|
| Mw | 7720 | 18650 | 9610 | 81450 | 7960 | 4880 |
| Mw/Mn | 3.4 | 5.0 | 4.1 | 11.7 | 2.1 | 2.5 |
| Viscosity (Pa · s) | 4.5 | 22.5 | 6.5 | >300 | 9.5 | 0.9 |

(1)Methyl methacrylate
(2)n-Butyl acrylate
(3)Stearyl methacrylate
(4)3-Methacryloxypropyltrimethoxysilane
(5)3-Mercaptopropyltrimethoxysilane Table 1 reveals that the (meth)acrylic ester copolymers (B-1) to (B-3), each of which was formed through copolymerization using both the polyfunctional macromonomer (b2) which is a (meth)acrylic ester polymer having more than one (meth)acryloyl groups per molecule and the chain transfer agent (b3) having a mercapto group, had a narrower molecular weight distribution and a lower viscosity than the (meth)acrylic ester copolymer (P-1) formed without the use of the chain transfer agent (b3) having a mercapto group.

As for the (meth)acrylic ester copolymer (P-3) formed using the allyl group-containing polyoxyalkylene polymer (p-1) instead of the (meth)acryloyl group-containing (meth) acrylic ester polymer (b2-1), the weight-average molecular weight (Mw) of the (meth)acrylic ester copolymer (P-3) indicates that the polymer (p-1) was hardly copolymerized.

That is, it is seen that the (meth)acrylic ester copolymers (B-1) to (B-3) had a narrow molecular weight distribution and a low viscosity despite the polyfunctional macromonomer (b2) being copolymerized.

The (meth)acrylic ester copolymers (B-1) to (B-3) were formed as block copolymers as a result of copolymerization of the polyfunctional macromonomer (b2) with the other monomers such as butyl acrylate. The (meth)acrylic ester copolymer (P-2) was a random copolymer because of the non-use of the polyfunctional macromonomer (b2). Table 1 reveals that the viscosity relative to the weight-average molecular weight (Mw) was lower for the (meth)acrylic ester copolymers (B-1) to (B-3) than for the (meth)acrylic ester copolymer (P-1). For example, the viscosity of the copolymer (B-1) was about half the viscosity of the copolymer (P-2) although the copolymers (B-1) and (P-2) were similar in weight-average molecular weight.

(Tensile Properties)

One part by weight of NEOSTANN U-20 (dibutyltin dibutylmaleate, manufactured by Nitto Kasei Co., Ltd.) was mixed as a curing catalyst with 100 parts by weight of the solids in each polymer solution, and the mixture was formed into a sheet with a thickness of 100 μm. The resulting sheet was cured and aged at 23 °C and 50% RH for 2 weeks. A strip-shaped test specimen with a size of 70 mm×10 mm was cut out from the aged sheet, and the tensile properties of the test specimen were measured at 23 °C with a chuck-to-chuck distance of 40 mm. The measured properties were modulus at 30% elongation (M30), tensile strength at break (TB), elongation at break (EB), and Young's modulus. The measurement of the tensile properties was carried out using Autograph (AGS-X) of Shimadzu Corporation at a tensile speed of 20 mm/min. The results obtained are shown in Table 2.

TABLE 2

| Monomer proportions | | (Meth)acrylic ester copolymer (B) or (P) B-4 | B-5 | B-9 | B-10 | P-4 |
|---|---|---|---|---|---|---|
| Monomer component | Monomer (b1): MMA(1) | 40.8 (75.2 mol %) | 51.5 (76.2 mol %) | 51.5 (76.0 mol %) | 51.5 (76.9 mol %) | 40.8 (50.2 mol %) |
| | Monomer (b1): BA(2) | 16.6 (21.5 mol %) | 21.0 (21.8 mol %) | 21.4 (22.2 mol %) | 18.8 (19.7 mol %) | 54.2 (46.9 mol %) |
| | Monomer (b1): 2-EHA(3) | 0.3 (0.3 mol %) | 0.4 (0.3 mol %) | 0.4 (0.3 mol %) | 0.4 (0.3 mol %) | 0.5 (0.3 mol %) |
| | Monomer (b1): SMA(4) | 0.3 (0.2 mol %) | 0.4 (0.2 mol %) | 0.4 (0.2 mol %) | 0.4 (0.2 mol %) | 0.5 (0.2 mol %) |
| | Monomer (b4): TSMA(5) | 0.3 (0.2 mol %) | 0.4 (0.2 mol %) | | 2.6 (1.5 mol %) | 0.5 (0.2 mol %) |
| | Chain transfer agent (b3): T-MSi(6) | 2.1 (2.0 mol %) | 1.3 (1.0 mol %) | 1.3 (1.0 mol %) | | 3.5 (2.2 mol %) |
| | Chain transfer agent (b3): n-DM(7) | | | | 1.4 (1.0 mol %) | |
| | Polyfunctional macromonomer (b2-3) | 39.6 (0.6 mol %) | 25.0 (0.3 mol %) | 25.0 (0.3 mol %) | 25.0 (0.3 mol %) | |
| b2/b3 (molar ratio) | | 0.33 | 0.33 | 0.33 | 0.32 | — |
| Sulfur atom concentration (ppm) | | 3429 | 2123 | 2119 | 2282 | 5716 |
| Mn | | 5830 | 9700 | 9460 | 9320 | 3770 |
| Mw | | 29800 | 36870 | 37830 | 37760 | 8340 |
| Mw/Mn | | 5.1 | 3.8 | 4.0 | 4.1 | 2.2 |

TABLE 2-continued

| | Monomer proportions | (Meth)acrylic ester copolymer (B) or (P) B-4 | B-5 | B-9 | B-10 | P-4 |
|---|---|---|---|---|---|---|
| Tensile properties | M30 (MPa) | 1.2 | 7.2 | 5.9 | 6.8 | Sample was not preparable |
| | TB (MPa) | 3.5 | 8.3 | 5.6 | 7.1 | |
| | EB (%) | 225 | 120 | 162 | 95 | |
| | Young's modulus (MPa) | 33 | 415 | 170 | 315 | |

(1)Methyl methacrylate
(2)n-Butyl acrylate
(3)2-Ethylhexyl acrylate
(4)Stearyl methacrylate
(5)3-Methacryloxypropyltrimethoxysilane
(6)3-Mercaptopropyltrimethoxysilane
(7)n-Dodecyl mercaptan As seen from Table 2, while a cured product formed from the (meth)acrylic ester copolymer (P-4) produced without the use of the polyfunctional macromonomer (b2) was not able to be processed to prepare a test specimen because of excessively high softness of the cured product, cured products obtained from the (meth)acrylic ester copolymers (B-4), (B-5), (B-9), and (B-10) produced through copolymerization of the polyfunctional macromonomer (b2) exhibited good tensile properties.

Next, the polyoxypropylene polymer (A-1) obtained in Synthesis Example 1 was mixed with each of those isobutanol solutions of the (meth)acrylic ester copolymers (B-6) to (B-8) and (P-5) to (P-8) which were obtained in Synthesis Examples 11 to 13, 21 to 23 and 25 in such proportions that the amount of the polyoxypropylene polymer (A-1) was 60 parts by weight and the amount of the solids in the isobutanol solution was 40 parts by weight. After that, isobutanol was evaporated by heating, and the viscosity of each of the mixtures was measured by the method described above. The results obtained are shown in Table 3.

TABLE 3

| | Monomer proportions | (Meth)acrylic ester copolymer (B) or (P) B-6 | B-7 | B-8 | P-5 | P-6 | P-7 | P-8 |
|---|---|---|---|---|---|---|---|---|
| Monomer component | Monomer (b1): MMA(1) | 50.0 | 50.0 | 50.0 | 50.0 | 50.0 | 50.0 | 50 |
| | Monomer (b1): BA(2) | 7.0 | 7.0 | | 37.0 | 30.0 | 30.0 | |
| | Monomer (b1): SMA(3) | 12.0 | 12.0 | 10.0 | 12.0 | 10.0 | 10.0 | 10 |
| | Monomer (b4): TSMA(4) | 1.0 | 1.0 | 10.0 | 1.0 | 10.0 | 10.0 | 10 |
| | Chain transfer agent (b3): T-MSi(5) | 7.2 | 7.2 | 7.2 | 7.2 | 7.2 | 1.8 | 7.2 |
| | Polyfunctional macromonomer (b2-1) | 30.0 | | 30.0 | | | | |
| | Polyfunctional macromonomer (b2-2) | | 30.0 | | | | | |
| | Macromonomer (p-2) having one (meth)acryloyl group | | | | | | | 30 |
| b2/b3 (molar ratio) | | 0.23 | 0.23 | 0.23 | — | — | — | — |
| Sulfur atom concentration (ppm) | | 10941 | 10941 | 10941 | 10941 | 10941 | 2939 | 10941 |
| Mn | | 2450 | 2280 | 2500 | 2190 | 2230 | 4100 | 1900 |
| Mw | | 8670 | 8150 | 9010 | 4350 | 4320 | 9650 | 4130 |
| Viscosity of mixture with polymer (A-1) | | 120 | 110 | 126 | 80 | 91 | 211 | 84 |

(1)Methyl methacrylate
(2)n-Butyl acrylate
(3)Stearyl methacrylate
(4)3-Methacryloxypropyltrimethoxysilane
(5)3-Mercaptopropyltrimethoxysilane Table 3 reveals that the viscosity relative to the weight-average molecular weight (Mw) was lower for the mixtures containing the polyoxyalkylene polymer (A) and the (meth) acrylic ester copolymer (B) than for the mixtures containing the (meth)acrylic ester copolymer (P) instead of the (meth) acrylic ester copolymer (B).

Specifically, each mixture containing a corresponding one of the (meth)acrylic ester copolymers (B-6) to (B-8) had a weight-average molecular weight which was about twice that of the mixture containing the (meth)acrylic ester copolymer (P-5) or (P-6) formed without the use of the polyfunctional macromonomer (b2), but the viscosity of each mixture containing a corresponding one of the (meth)acrylic ester copolymers (B-6) to (B-8) was only about 1.5 times that of the mixture containing the (meth)acrylic ester copolymer (P-5) or (P-6). Additionally, the viscosity of each mixture containing a corresponding one of the (meth)acrylic ester copolymers (B-6) to (B-8) was much lower than, in particular about 50 to 60% of, that of the mixture containing the (meth)acrylic ester copolymer (P-7) formed without the use of the polyfunctional macromonomer (b2) and having a somewhat higher weight-average molecular weight than the copolymers (B-6) to (B-8).

Furthermore, each mixture containing a corresponding one of the (meth)acrylic ester copolymers (B-6) to (B-8) had a weight-average molecular weight which was about twice that of the mixture containing the (meth)acrylic ester copolymer (P-8) formed using the monomer (p-2) having only one (meth)acryloyl group in the molecule instead of the polyfunctional macromonomer (b2), but the viscosity of each mixture containing a corresponding one of the (meth) acrylic ester copolymers (B-6) to (B-8) was only about 1.5 times that of the mixture containing the (meth)acrylic ester copolymer (P-8).

Example 1

The reactive silicon group-containing polyoxypropylene polymer (A-1) obtained in Synthesis Example 1 was mixed with that isobutanol solution of the (meth)acrylic ester copolymer (B-6) which was obtained in Synthesis Example 11 in such proportions that the amount of the polyoxypropylene polymer (A-1) was 60 parts by weight and the amount of the solids in the isobutanol solution was 40 parts by weight. After that, isobutanol was evaporated by heating. The resulting mixture was further mixed using a planetary mixer with 40 parts by weight of NANOX #30 serving as a filler (ground calcium carbonate, manufactured by Maruo Calcium Co., Ltd.), 30 parts by weight of CCR-S10 serving as a filler (synthetic calcium carbonate, manufactured by Shiraishi Calcium Kaisha, Ltd.), 20 parts by weight of ACTCOL P-23 serving as a plasticizer (polypropylene glycol, manufactured by Mitsui Chemicals, Inc.), 2.5 parts by weight of DISPARLON 6500 serving as a thixotropy-imparting agent (fatty acid amide wax, manufactured by Kusumoto Chemicals, Ltd.), 1 part by weight of NOCRAC CD serving as an antioxidant (4,4'-bis(α,α-dimethylbenzyl) diphenylamine, manufactured by Ouchi Shinko Chemical Industrial Co., Ltd.), and 1 part by weight of ADK STAB AO-60 serving as an antioxidant (pentaerythritol tetrakis 3-(3,5-di-tert-butyl-4-hydroxyphenyl)propionate, manufactured by Adeka Corporation). The resulting mixture was dehydrated by heating it at 120 °C under reduced pressure for 1 hour. The resulting composition was cooled and mixed with 3 parts by weight of A-171 serving as a dehydrating agent (vinyltrimethoxysilane, manufactured by Momentive Performance Materials), 3 parts by weight of KBM-603 serving as an adhesion promoter (N-(2-aminoethyl)-3-aminopropyltrimethoxysilane, manufactured by Shin-Etsu Chemical Co., Ltd.), and 0.3 parts by weight of NEOSTANN U-810 serving as a curing catalyst (dioctyltin dilaurate, manufactured by Nitto Kasei Co., Ltd.). Thus, a one-part curable composition was obtained.

(Viscosity)

The one-part curable composition obtained was measured for viscosity. For the measurement, a parallel plate with a diameter of 25 mm was used as a jig, the gap was set to 0.5 mm, and the rotational speed was set to 0.2 $sec^{-1}$ or 10 $sec^{-1}$. The device used was a rheometer manufactured by TA instruments (ARES-G2). A viscosity ratio, (viscosity measured at 0.2 $sec^{-1}$/viscosity measured at 10 $sec^{-1}$), was calculated. The results obtained are shown in Table 4.

(Tensile Properties)

The one-part curable composition obtained was used to prepare a sheet with a thickness of about 2 mm. The sheet was cured and aged at 23 °C and 50% RH for 3 days and then at 50 °C for 4 days. The resulting sheet was punched to give a No. 3 dumbbell-shaped specimen (JIS K 6251), which was subjected to tensile strength testing at 23 °C and 50% RH to measure modulus at 50% elongation (M50) and tensile strength at break (TB). The measurement of the tensile properties was carried out using Autograph (AGS-X) of Shimadzu Corporation at a tensile speed of 200 mm/min. The results obtained are shown in Table 4.

(Shear Bond Strength)

Steel plates (SS 400) for use as adherends were polished with sandpaper #400. The one-part curable composition was applied to a thickness of 0.5 mm over an adhesion area of 25 mm×12.5 mm, and the adherends were bonded together. The point in time at which the bonding was completed was defined as a start time, and the bonded adherends were left at 23 °C and 50% RH for 7 days and then at 50 °C for 4 days, after which the adherends were subjected to shear bond strength measurement at a test speed of 10 mm/min, and the failure mode was inspected. The failure mode was visually identified as cohesive failure (failure occurring in the layer of adhesive) or adhesive failure (separation occurring at the interface between the adhesive and either of the adherends). Cohesive failure is denoted by "CF", while adhesive failure is denoted by "AF". For the case where both types of failure occurred, the percentage of each type of failure is indicated. For example, the case where the cohesive failure percentage was 50% and the adhesive failure percentage was 50% is denoted by "C50A50". The results are shown in Table 4.

Example 2 and Comparative Example 1

One-part curable compositions were prepared and evaluated for viscosity, tensile properties, and shear bond strength in the same manner as in Example 1, except that the component proportions were changed as shown in Table 4. The results are shown in Table 4.

TABLE 4

| Proportions (parts by weight) | | Example 1 | Example 2 | Comparative Example 1 |
|---|---|---|---|---|
| Polymer (A) | A-1 | 60 | 60 | 60 |
| Polymer (B) | B-6 | 40 | | |
| | B-7 | | 40 | |
| Polymer (P) | P-5 | | | 40 |
| Filler | NANOX #30(1) | 40 | 40 | 40 |
| | CCR-S10(1') | 30 | 30 | 30 |
| Plasticizer | ACTCOL P-23 | 20 | 20 | 20 |
| Thixotropy-imparting agent | DISPARLON 65000(2) | 2.5 | 2.5 | 2.5 |
| Antioxidant | NOCRAC CD(3) | 1 | 1 | 1 |
| | ADK STAB AO-60 | 1 | 1 | 1 |
| Dehydrating agent | A-171(4) | 3 | 3 | 3 |
| Adhesion promoter | KBM-603(5) | 3 | 3 | 3 |
| Curing catalyst | NEOSTANN U-810(6) | 0.3 | 0.3 | 0.3 |
| Viscosity (Pa · s) | 0.2 $sec^{-1}$ | 1430 | 710 | 680 |
| at 25° C. | 10 $sec^{-1}$ | 185 | 125 | 120 |
| Viscosity ratio | | 7.7 | 5.7 | 5.7 |
| Tensile properties | M50 (MPa) | 0.8 | 0.5 | 0.4 |
| | TB (MPa) | 4.2 | 3.8 | 3.0 |
| Shear bond strength (MPa) | Steel plate | 5.0<br>CF | 4.5<br>CF | 4.4<br>CF |

(1)Ground calcium carbonate, primary particle size = 1 μm (Maruo Calcium Co., Ltd.)
(1')Synthetic calcium carbonate (Shiraishi Calcium Kaisha, Ltd.)
(2)Fatty acid amide wax (Kusumoto Chemicals, Ltd.)
(3)Antioxidant (BASF)
(4)Vinyltrimethoxysilane (Momentive Performance Materials)
(5)N-(2-Aminoethyl)-3-aminopropyltrimethoxysilane (Shin-Etsu Chemical Co., Ltd.)
(6)Dioctyltin dilaurate (Nitto Kasei Co., Ltd.)

Referring to Table 4, comparison of Examples 1 and 2 with Comparative Example 1 reveals that the compositions of Examples, each of which contained the polyoxyalkylene polymer (A) and the (meth)acrylic ester copolymer (B), gave cured products having higher tensile strength and higher shear bond strength than a cured product formed from the composition of Comparative Example which contained, instead of the (meth)acrylic ester copolymer (B), the (meth) acrylic ester copolymer (P-5) formed without the use of the polyfunctional macromonomer (b2).

It is also seen that the composition of Example 1, which contained the (meth)acrylic ester copolymer (B-6) formed using a small amount of 3-methacryloxypropyltrimethoxysilane as the monomer (b4) having a reactive silicon group and a polymerizable unsaturated group, had a greater viscosity ratio and hence a higher degree of thixotropy than the composition of Example 3 described below which contained the (meth)acrylic ester copolymer (B-8) formed using a large amount of 3-methacryloxypropyltrimethoxysilane.

Example 3 and Comparative Example 2

One-part curable compositions were prepared and evaluated for viscosity, tensile properties, and shear bond strength in the same manner as in Example 1, except that the component proportions were changed as shown in Table 5. The results are shown in Table 5.

TABLE 5

| Proportions (parts by weight) | | Example 3 | Comparative Example 2 |
|---|---|---|---|
| Polymer (A) | A-1 | 60 | 60 |
| Polymer (B) | B-8 | 40 | |
| Polymer (P) | P-6 | | 40 |
| Calcium carbonate | NANOX #30(1) | 40 | 40 |
| | CCR-S10(1') | 30 | 30 |
| Plasticizer | ACTCOL P-23 | 20 | 20 |
| Thixotropy-imparting agent | DISPARLON 65000(2) | 2.5 | 2.5 |
| Antioxidant | NOCRAC CD(3) | 1 | 1 |
| | ADK STAB AO-60 | 1 | 1 |
| Dehydrating agent | A-171(4) | 3 | 3 |
| Adhesion promoter | KBM-603(5) | 3 | 3 |
| Curing catalyst | NEOSTANN U-810(6) | 0.3 | 0.3 |
| Viscosity (Pa · s) | 0.2 $sec^{-1}$ | 870 | 640 |
| at 25° C. | 10 $sec^{-1}$ | 180 | 110 |
| Viscosity ratio | | 4.8 | 5.8 |
| Tensile properties | M50 (MPa) | 2.5 | 2.0 |
| | TB (MPa) | 6.3 | 5.0 |
| Shear bond strength (MPa) | Steel plate | 6.0 CF | 5.7 CF |

(1)Ground calcium carbonate, primary particle size = 1 μm (Maruo Calcium Co., Ltd.)
(1')Synthetic calcium carbonate (Shiraishi Calcium Kaisha, Ltd.)
(2)Fatty acid amide wax (Kusumoto Chemicals, Ltd.)
(3)Antioxidant (BASF)
(4)Vinyltrimethoxysilane (Momentive Performance Materials)
(5)N-(2-Aminoethyl)-3-aminopropyltrimethoxysilane (Shin-Etsu Chemical Co., Ltd.)
(6)Dioctyltin dilaurate (Nitto Kasei Co., Ltd.)

Referring to Table 5, comparison of Example 3 with Comparative Example 2 reveals that the composition of Example 3, which contained the polyoxyalkylene polymer (A) and the (meth)acrylic ester copolymer (B), gave a cured product having higher tensile strength and higher shear bond strength than a cured product formed from the composition of Comparative Example 2 which contained, instead of the (meth)acrylic ester copolymer (B), the (meth)acrylic ester copolymer (P-6) formed without the use of the polyfunctional macromonomer (b2).

Example 4 and Comparative Example 3

One-part curable compositions were prepared and evaluated for tensile properties in the same manner as in Example 1, except that the component proportions were changed as shown in Table 6. The results are shown in Table 6.

TABLE 6

| Proportions (parts by weight) | | Example 4 | Comparative Example 3 |
|---|---|---|---|
| Polymer (A) | A-2 | 60 | 60 |
| Polymer (B) | B-11 | 40 | |
| Polymer (P) | P-9 | | 40 |
| Calcium carbonate | NANOX #30(1) | 40 | 40 |
| | CCR-S10(1') | 30 | 30 |
| Plasticizer | ACTCOL P-23 | 20 | 20 |
| Thixotropy-imparting agent | DISPARLON 65000(2) | 2.5 | 2.5 |
| Antioxidant | NOCRAC CD(3) | 1 | 1 |
| | ADK STAB AO-60 | 1 | 1 |
| Dehydrating agent | A-171(4) | 3 | 3 |
| Adhesion promoter | KBM-603(5) | 3 | 3 |
| Curing catalyst | NEOSTANN U-810(6) | 1.5 | 0.3 |
| Tensile properties | M50 (MPa) | 0.7 | 0.5 |
| | TB (MPa) | 3.8 | 3.0 |

(1)Ground calcium carbonate, primary particle size = 1 μm (Maruo Calcium Co., Ltd.)
(1')Synthetic calcium carbonate (Shiraishi Calcium Kaisha, Ltd.)
(2)Fatty acid amide wax (Kusumoto Chemicals, Ltd.)
(3)Antioxidant (BASF)
(4)Vinyltrimethoxysilane (Momentive Performance Materials)
(5)N-(2-Aminoethyl)-3-aminopropyltrimethoxysilane (Shin-Etsu Chemical Co., Ltd.)
(6)Dioctyltin dilaurate (Nitto Kasei Co., Ltd.)

Referring to Table 6, comparison of Example 4 with Comparative Example 3 reveals that the composition of Example 4, which contained the polyoxyalkylene polymer (A) and the (meth)acrylic ester copolymer (B), gave a cured product having higher tensile strength than a cured product formed from the composition of Comparative Example 3 which contained, instead of the (meth)acrylic ester copolymer (B), the (meth)acrylic ester copolymer (P-9) formed without the use of the polyfunctional macromonomer (b2).

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

The invention claimed is:

1. A (meth)acrylic ester copolymer (B) comprising a reactive silicon group represented by the following formula (1): $-SiR^5_cX_{3-c}$ (1), wherein $R^5$ is a substituted or unsubstituted hydrocarbon group having 1 to 20 carbon atoms, X is a hydroxy group or a hydrolyzable group, and c is 0 or 1, wherein:

a monomer component of the copolymer (B) comprises:
- a (meth)acrylic ester (b1);
- a (meth)acrylic ester polymer (b2) having more than one (meth)acryloyl groups per molecule; and
- a chain transfer agent (b3) having a mercapto group, the monomer component further comprises a monomer (b4) having a reactive silicon group and a polymerizable unsaturated group, and/or the chain transfer agent (b3) having a mercapto group further has a reactive silicon group, and a monomer component forming a backbone of the (meth) acrylic ester polymer (b2) having more than one (meth) acryloyl groups per molecule comprises 60 wt % or more of an acrylic ester other than isobornyl acrylate, dicyclopentenyl acrylate, and dicyclopentanyl acrylate.

2. The (meth)acrylic ester copolymer (B) according to claim 1, wherein the (meth)acrylic ester polymer (b2) constitutes 0.2 to 5.0 mol % of the monomer component.

3. The (meth)acrylic ester copolymer (B) according to claim 1, wherein the chain transfer agent (b3) having a mercapto group constitutes 0.4 to 15 mol % of the monomer component.

4. The (meth)acrylic ester copolymer (B) according to claim 1, wherein the (meth)acrylic ester polymer (b2) has a number-average molecular weight of 500 to 50,000.

5. The (meth)acrylic ester copolymer (B) according to claim 1, wherein the (meth)acrylic ester copolymer (B) has a weight-average molecular weight of 80,000 or less.

6. The (meth)acrylic ester copolymer (B) according to claim 1, wherein the (meth)acrylic ester copolymer (B) has a dispersity of 3.0 to 11.0.

7. The (meth)acrylic ester copolymer (B) according to claim 1, wherein a molar ratio of the (meth)acrylic ester polymer (b2) to the chain transfer agent (b3) having a mercapto group is 0.12 or more.

8. A (meth)acrylic ester copolymer (B) comprising a reactive silicon group represented by the following formula (1): $—SiR^5_cX_{3-c}$ (1), wherein $R^5$ is a substituted or unsubstituted hydrocarbon group having 1 to 20 carbon atoms, X is a hydroxy group or a hydrolyzable group, and c is 0 or 1, wherein:

the copolymer (B) comprises a structure in which two first molecular chains are bonded to each other via one second molecular chain, both ends of the second molecular chain are bonded to a non-terminal moiety of one of the first molecular chains and a non-terminal moiety of the other first molecular chain, respectively, each of the first and second molecular chains comprises a molecular chain of a (meth)acrylic ester copolymer, the reactive silicon group is bonded to each of the first molecular chains, each of the first molecular chains has, at either end thereof, a structure represented by —S—R, wherein S is a sulfur atom and R is a hydrocarbon group optionally having the reactive silicon group, and a monomer component of the second molecular chain comprises 60 wt % or more of an acrylic ester other than isobornyl acrylate, dicyclopentenyl acrylate, and dicyclopentanyl acrylate.

9. The (meth)acrylic ester copolymer (B) according to claim 8, wherein a monomer component of the first molecular chain comprises at least one monomer selected from the group consisting of a methacrylic ester, isobornyl acrylate, dicyclopentenyl acrylate, and dicyclopentanyl acrylate, and a monomer component of the second molecular chain comprises an acrylic ester.

10. The (meth)acrylic ester copolymer (B) according to claim 9, wherein the at least one monomer selected from the group consisting of a methacrylic ester, isobornyl acrylate, dicyclopentenyl acrylate, and dicyclopentanyl acrylate constitutes 60 wt % or more of the monomer component of the first molecular chain, and the acrylic ester constitutes 60 wt % or more of the monomer component of the second molecular chain.

11. The (meth)acrylic ester copolymer (B) according to claim 8, wherein a sulfur atom concentration in the (meth) acrylic ester copolymer (B) is from 700 to 20,000 ppm.

12. A curable composition comprising the (meth)acrylic ester copolymer (B) according to claim 1.

13. The curable composition according to claim 12, further comprising a polyoxyalkylene polymer (A) having a reactive silicon group represented by the formula (1).

14. The curable composition according to claim 13, wherein the polyoxyalkylene polymer (A) has a terminal structure represented by the following formula (2):

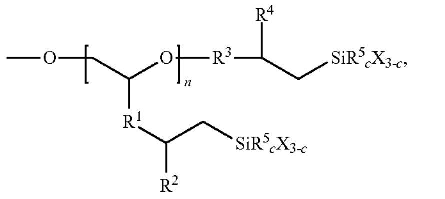

(2)

wherein $R^1$ and $R^3$ are each independently a divalent linkage group having 1 to 6 carbon atoms, atoms of $R^1$ and $R^3$ that are bonded to carbon atoms adjacent to $R^1$ and $R^3$ are each independently carbon, oxygen, or nitrogen, $R^2$ and $R^4$ are each independently hydrogen or a hydrocarbon group having 1 to 10 carbon atoms, n is an integer from 1 to 10, $R^5$ is a substituted or unsubstituted hydrocarbon group having 1 to 20 carbon atoms, X is a hydroxy group or a hydrolyzable group, and c is 0 or 1.

15. A cured product of the curable composition according to claim 12.

16. A method of producing a (meth)acrylic ester copolymer (B) comprising:

copolymerizing a monomer component, wherein:

the monomer component comprises:

a (meth)acrylic ester (b1);

a (meth)acrylic ester polymer (b2) having more than one (meth)acryloyl groups per molecule; and a chain transfer agent (b3) having a mercapto group, the monomer component further comprises a monomer (b4) having a reactive silicon group and a polymerizable unsaturated group, and/or the chain transfer agent (b3) having a mercapto group further has a reactive silicon group, the (meth)acrylic ester copolymer (B) has a reactive silicon group represented by the following formula (1): $—SiR^5_cX_{3-c}$ (1), wherein $R^5$ is a substituted or unsubstituted hydrocarbon group having 1 to 20 carbon atoms, X is a hydroxy group or a hydrolyzable group, and c is 0 or 1, and a monomer component forming a backbone of the (meth)acrylic ester polymer (b2) having more than one (meth)acryloyl groups per molecule comprises 60 wt % or more of an acrylic ester other than isobornyl acrylate, dicyclopentenyl acrylate, and dicyclopentanyl acrylate.

17. The (meth)acrylic ester copolymer (B) according to claim 1, wherein a content of the (meth)acrylic ester polymer (b2) is from 1 wt % to 40 wt % relative to a total amount of a monomer component of the (meth)acrylic ester copolymer (B).

18. The (meth)acrylic ester copolymer (B) according to claim 4, wherein the (meth)acrylic ester polymer (b2) has a number-average molecular weight of 15,000 or less.

19. The (meth)acrylic ester copolymer (B) according to claim 4, wherein the (meth)acrylic ester polymer (b2) has a number-average molecular weight of 8,000 or less.

20. The (meth)acrylic ester copolymer (B) according to claim 5, wherein the (meth)acrylic ester copolymer (B) has a weight-average molecular weight of 30,000 or more.

* * * * *